(12) United States Patent
Chen et al.

(10) Patent No.: US 11,552,763 B2
(45) Date of Patent: Jan. 10, 2023

(54) TECHNIQUES FOR TRANSMITTING A PHYSICAL UPLINK SHARED CHANNEL IN AN UPLINK PILOT TIME SLOT

(71) Applicant: QUALCOMM Incorporated, San Diego, CA (US)

(72) Inventors: Wanshi Chen, San Diego, CA (US); Jing Sun, San Diego, CA (US); Alberto Rico Alvarino, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/174,823

(22) Filed: Oct. 30, 2018

(65) Prior Publication Data

US 2019/0074948 A1 Mar. 7, 2019

Related U.S. Application Data

(63) Continuation of application No. 15/462,356, filed on Mar. 17, 2017.
(Continued)

(51) Int. Cl.
*H04L 5/00* (2006.01)
*H04W 72/04* (2009.01)

(52) U.S. Cl.
CPC ....... *H04L 5/0051* (2013.01); *H04W 72/0406* (2013.01); *H04L 5/0053* (2013.01)

(58) Field of Classification Search
None
See application file for complete search history.

(56) References Cited

U.S. PATENT DOCUMENTS 9,686,788 B2 6/2017 Chen et al.
9,800,362 B2 * 10/2017 Yang ................. H04W 72/0413
(Continued)

FOREIGN PATENT DOCUMENTS

CN 104685822 A 6/2015
WO WO-2015149325 A1 10/2015
(Continued)

OTHER PUBLICATIONS

CMCC: "Discussion on PUSCH transmission for UpPTS", 3GPP TSG RAN WG1 Meeting #85, R1-164884, May 13, 2016, XP051096840, Retrieved from the Internet: URL:http://www.3gpp.org/ftp/tsg_ran/WG1_RL1/TSGR1_85/Docs/, 3 pages.
(Continued)

*Primary Examiner* — Steve R Young
(74) *Attorney, Agent, or Firm* — Holland & Hart LLP

(57) ABSTRACT

Techniques for wireless communication are described. A method for wireless communication at a user equipment (UE) includes identifying a physical uplink shared channel (PUSCH) to transmit in an uplink pilot time slot (UpPTS) of a subframe, determining whether to transmit uplink control information (UCI) on the PUSCH in the UpPTS, and transmitting the PUSCH in the UpPTS based at least in part on the determining. A method for wireless communication at a network access device includes determining whether to schedule a transmission of UCI on a PUSCH in a UpPTS of a subframe, scheduling the PUSCH in the UpPTS based at least in part on the determining, and transmitting, to a UE, scheduling information for the PUSCH in the UpPTS.

30 Claims, 16 Drawing Sheets

Related U.S. Application Data

(60) Provisional application No. 62/357,843, filed on Jul. 1, 2016, provisional application No. 62/372,642, filed on Aug. 9, 2016.

(56) References Cited

U.S. PATENT DOCUMENTS

| | | | |
|---|---|---|---|
| 10,097,335 B2* | 10/2018 | Lee | H04L 5/001 |
| 10,454,624 B2* | 10/2019 | Park | H04L 1/1812 |
| 10,594,428 B2* | 3/2020 | Shimezawa | H04W 72/042 |
| 2010/0322177 A1 | 12/2010 | Luo et al. | |
| 2011/0300854 A1 | 12/2011 | Shan et al. | |
| 2011/0310759 A1 | 12/2011 | Gerstenberger et al. | |
| 2012/0009923 A1 | 1/2012 | Chen et al. | |
| 2013/0272233 A1 | 10/2013 | Dinan | |
| 2013/0324182 A1* | 12/2013 | Deng | H04W 92/18 455/522 |
| 2013/0343313 A1* | 12/2013 | Takeda | H04L 5/001 370/329 |
| 2014/0086119 A1 | 3/2014 | Yang et al. | |
| 2014/0185539 A1 | 7/2014 | Seo et al. | |
| 2014/0328260 A1* | 11/2014 | Papasakellariou | H04L 5/0055 370/329 |
| 2015/0043392 A1 | 2/2015 | Susitaival et al. | |
| 2015/0103704 A1* | 4/2015 | Skov | H04W 72/0446 370/280 |
| 2015/0230211 A1 | 8/2015 | You et al. | |
| 2016/0056933 A1* | 2/2016 | Aiba | H04L 5/0048 370/329 |
| 2016/0150487 A1 | 5/2016 | Aiba et al. | |
| 2016/0323852 A1 | 11/2016 | Golitschek et al. | |
| 2016/0338049 A1 | 11/2016 | Takeda et al. | |
| 2017/0215206 A1 | 7/2017 | Cheng et al. | |
| 2017/0273071 A1* | 9/2017 | Nogami | H04W 72/0413 |
| 2017/0278320 A1 | 9/2017 | Isozaki et al. | |
| 2017/0310447 A1* | 10/2017 | Kusashima | H04W 72/0406 |
| 2017/0317790 A1* | 11/2017 | Yao | H04L 1/1812 |
| 2017/0331606 A1* | 11/2017 | Chen | H04W 76/27 |
| 2018/0006787 A1 | 1/2018 | Chen et al. | |
| 2018/0262307 A1 | 9/2018 | Shimezawa et al. | |
| 2018/0270848 A1* | 9/2018 | Liang | H04W 72/1289 |
| 2018/0343088 A1* | 11/2018 | Kusashima | H04L 5/1469 |
| 2019/0036676 A1* | 1/2019 | Takeda | H04W 6/27 |

FOREIGN PATENT DOCUMENTS

| | | |
|---|---|---|
| WO | WO-2015186824 A1 | 12/2015 |
| WO | WO-2015196460 A1 | 12/2015 |

OTHER PUBLICATIONS

International Search Report and Written Opinion—PCT/US2017/036189—ISA/EPO—dated Sep. 15, 2017.

NTT DOCOMO et al., "Discussion about TDD Frame Structure for Latency Reduction", 3GPP TSG RAN WG1 Meeting #84bis, R1-163174, Apr. 1, 2016, XP051079879, Retrieved from the Internet: URL:http://www.3gpp.org/ftp/tsg ran/WG1_RL1/TSGR1_84b/Docs/, 5 pages.

Mediatek Inc: "Flexible Frame Structure for New Radio Access Technology" [online], 3GPP Draft, 3GPP TSG-RAN WG1#85, R1-165163, May 23, 2016, 5 Pages, Retrieved from the Internet: URL:http://www.3gpp.org/ftp/tsg_ran/WG1_RL1/TSGR1_1270/Docs/R1-165163.zip, Section 2.4, Figure 4.

Qualcomm Incorporated: "Summary of Email Discussion on Frame Structure" [online], 3GPP Draft, 3GPP TSG-RAN WG1 #85, R1-165456_Frame_Structure_Discussion, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 24, 2016 (May 24, 2016), XP051104210, pp. 1-28, p. 5, Figure2, Retrieved from the Internet: URL: http://www.3gpp.org/ftp/Meetings_3GPP_SYNC/RAN1/Docs/ [retrieved on May 24, 2016].

3rd Generation Partnership Project, Technical Specification Group Radio Access Network, Evolved Universal Terrestrial Radio Access (E-UTRA), Study on Latency Reduction Techniques for LTE (Release 14), 3GPP Draft, RP-161024, 36881-100, 3rd Generation Partnership Project (3GPP), Mobile Competence Centre, 650, Route Des Lucioles, F-06921 Sophia-Antipolis Cedex, France, Jun. 12, 2016 (Jun. 12, 2016), XP051103873, 98 Pages, Retrieved from the Internet: URL: http://www.3gpp.org/ftp/Meetings_3GPP_SYNC/RAN/Docs/. [retrieved on Jun. 12, 2016] section 1, section 8.

European Search Report—EP21189765—Search Authority—The Hague—dated Oct. 21, 2021.

European Search Report—EP20197339—Search Authority—The Hauge—dated Dec. 8, 2020.

Taiwan Search Report—TW106118455—TIPO—dated Apr. 6, 2021.

ZTE, et al., "Latency Reduction Solutions for TDD [online]", 3GPP TSG-RAN WG1#85 R1-164638, Nanjing, China, May 23-27, 2016, Internet< url: http://www.3gpp.org/ftp/tsg_ran/WG1_RL1/TSGR1_754/Docs/R1-164638.zip , May 23, 2016, pp. 1-7.</url:>.

LG Electronics: "Processing Time Reduction for Latency Reduction", 3GPP TSG RAN WG1 Meeting #85, 3GPP Draft, R1-165429, Nanjing, China, May 23-27, 2016, 7 Pages, Fig. 2, Chapters 1, 2.1, 2.2 and 2.3.

Taiwan Search Report—TW110137706—TIPO—dated Jun. 9, 2022.

ZTE: "Considerations on PUSCH design in special subframe", 3GPP TSG-RAN WG1#86, R1-166601, Aug. 22, 2016, No. 2.1. Section1, 6 Pages.

* cited by examiner

| TDD DL-UL Subframe Configuration | DL-UL Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2

TECHNIQUES FOR TRANSMITTING A PHYSICAL UPLINK SHARED CHANNEL IN AN UPLINK PILOT TIME SLOT

CROSS REFERENCES

The present Application is a Continuation of U.S. patent application Ser. No. 15/462,356 by Chen, et al., entitled "Techniques For Transmitting A Physical Uplink Shared Channel In An Uplink Pilot Time Slot" filed Mar. 17, 2017, which claims priority to U.S. Provisional Patent Application No. 62/357,843 by CHEN, et al., entitled "Techniques for Transmitting A Physical Uplink Shared Channel In An Uplink Pilot Time Slot," filed Jul. 1, 2016 and to U.S. Provisional Patent Application No 62/372,642 by CHEN, et al., entitled "Techniques for Transmitting A Physical Uplink Shared Channel In An Uplink Pilot Time Slot," filed Aug. 9, 2016, assigned to the assignee hereof.

BACKGROUND

Field of the Disclosure

The present disclosure, for example, relates to wireless communication systems, and more particularly to techniques for transmitting a physical uplink shared channel (PUSCH) in an uplink pilot time slot (UpPTS) such as a six symbol period UpPTS.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations), each simultaneously supporting communication for multiple communication devices, otherwise known as user equipment (UEs). A base station may communicate with UEs on downlink channels (e.g., downlinks, for transmissions from a base station to a UE) and uplink channels (e.g., uplinks, for transmissions from a UE to a base station).

Some wireless communication systems may provide a UpPTS during a portion of a subframe. A UE may transmit pilot signals (or reference signals) to a base station during a UpPTS.

SUMMARY

In some Long Term Evolution (LTE) and LTE-Advanced (LTE-A) networks, a two symbol period uplink pilot time slot (UpPTS) is provided in some subframes of some configurations of a time domain duplexing (TDD) radio frame structure. The two symbol period UpPTS may be used by user equipment (UEs) to transmit pilot signals (or reference signals) to a base station. The two symbol period UpPTS may also be used by UEs performing random access procedures. In some LTE/LTE-A networks, a six symbol period UpPTS may be provided in some subframes of some configurations of a TDD radio frame structure. The present disclosure describes techniques for transmitting a physical uplink shared channel (PUSCH) in a UpPTS.

In one example, a method for wireless communication at a UE is described. The method may include identifying a PUSCH to transmit in a UpPTS of a subframe, determining whether to transmit uplink control information (UCI) on the PUSCH in the UpPTS, and transmitting the PUSCH in the UpPTS based at least in part on the determining.

In one example, an apparatus for wireless communication at a UE is described. The apparatus may include means for identifying a PUSCH to transmit in a UpPTS of a subframe, means for determining whether to transmit UCI on the PUSCH in the UpPTS, and means for transmitting the PUSCH in the UpPTS based at least in part on the determining.

In one example, another apparatus for wireless communication at a UE is described. The apparatus may include a processor, and memory in electronic communication with the processor. The processor and the memory may be configured to identify a PUSCH to transmit in a UpPTS of a subframe, determine whether to transmit UCI on the PUSCH in the UpPTS, and transmit the PUSCH in the UpPTS based at least in part on the determining.

In one example, a non-transitory computer-readable medium storing computer-executable code for wireless communication at a UE is described. The code may be executable by a processor to identify a PUSCH to transmit in a UpPTS of a subframe, determine whether to transmit UCI on the PUSCH in the UpPTS, and transmit the PUSCH in the UpPTS based at least in part on the determining.

Some examples of the method, apparatus, and non-transitory computer-readable medium described above may further include processes, features, means, instructions, or code for receiving, during a transmission time interval (TTI), scheduling information for the PUSCH in the UpPTS. A timing of the TTI may be based at least in part on a latency reduction capability of the UE. In some examples of the method, apparatus, and non-transitory computer-readable medium described above, the latency reduction capability of the UE may include at least one of: a scheduling timing reduction capability, a TTI duration reduction capability, or a combination thereof. In some examples of the method, apparatus, and non-transitory computer-readable medium described above, the timing of the TTI in which the scheduling information is received may include: a leading boundary occurring at least two subframes prior to the UpPTS, or a leading boundary occurring at least 2.5 subframes prior to the UpPTS.

Some examples of the method, apparatus, and non-transitory computer-readable medium described above may further include processes, features, means, instructions, or code for at least one of: separately managing uplink hybrid automatic repeat request (HARQ) for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, receiving the uplink HARQ for the PUSCH in the UpPTS and the uplink HARQ for PUSCH transmissions in uplink TTIs asynchronously, or receiving an acknowledgement of the PUSCH in the UpPTS in a same set of physical HARQ indicator channel (PHICH) resources used to acknowledge PUSCH transmissions in uplink subframes.

Some examples of the method, apparatus, and non-transitory computer-readable medium described above may further include processes, features, means, instructions, or code for determining whether an uplink TTI is scheduled to be transmitted on at least a first component carrier (CC) while the PUSCH in the UpPTS is transmitted on a second CC. The determining whether to transmit UCI on the PUSCH may be based at least in part on whether the uplink TTI is scheduled to be transmitted on at least the first CC.

Some examples of the method, apparatus, and non-transitory computer-readable medium described above may further include processes, features, means, instructions, or code for determining the PUSCH in the UpPTS is scheduled to be transmitted when operating in a carrier aggregation mode, and determining, based at least in part on the determining the PUSCH in the UpPTS is scheduled to be transmitted when operating in the carrier aggregation mode, to not transmit at least one of: periodic channel state information (P-CSI) on the PUSCH in the UpPTS, aperiodic channel state information (A-CSI) on the PUSCH in the UpPTS, UCI on the PUSCH in the UpPTS, or a combination thereof.

Some examples of the method, apparatus, and non-transitory computer-readable medium described above may further include processes, features, means, instructions, or code for determining the PUSCH in the UpPTS is scheduled to be transmitted when operating in a carrier aggregation mode, and determining to transmit, in parallel with the PUSCH in the UpPTS, on a CC that does not carry the PUSCH in the UpPTS, and based at least in part on the determining the PUSCH in the UpPTS is scheduled to be transmitted when operating in the carrier aggregation mode, at least one of: P-CSI, A-CSI, UCI, or a combination thereof.

Some examples of the method, apparatus, and non-transitory computer-readable medium described above may further include processes, features, means, instructions, or code for determining the PUSCH in the UpPTS is scheduled to be transmitted when operating in a carrier aggregation mode, and selecting a CC for transmitting UCI based at least in part on a prioritization of CCs that biases CC selection away from a CC carrying the PUSCH in the UpPTS.

Some examples of the method, apparatus, and non-transitory computer-readable medium described above may further include processes, features, means, instructions, or code for determining whether the UE is configured for parallel physical uplink control channel (PUCCH) and PUSCH transmission, and determining whether to transmit UCI on the PUSCH based at least in part on whether the UE is configured for parallel PUCCH and PUSCH transmission.

Some examples of the method, apparatus, and non-transitory computer-readable medium described above may further include processes, features, means, instructions, or code for receiving downlink control information (DCI), and identifying an uplink grant for the PUSCH in the UpPTS, received in the DCI, based at least in part on: a state of an information field included in the DCI, a masking of a control channel including the DCI with a predetermined cyclic redundancy check (CRC) mask, an association of the uplink grant with a predetermined decoding candidate, a size of the DCI, an identifier of a subframe in which the DCI is received, a DCI format, or a combination thereof.

Some examples of the method, apparatus, and non-transitory computer-readable medium described above may further include processes, features, means, instructions, or code for receiving DCI, determining a size of the DCI, and identifying, within the DCI, at least one decoding candidate for an uplink grant for the PUSCH in the UpPTS, the at least one decoding candidate based at least in part on the size of the DCI.

Some examples of the method, apparatus, and non-transitory computer-readable medium described above may further include processes, features, means, instructions, or code for identifying a first power control parameter for a TTI, and determining a second power control parameter for the PUSCH in the UpPTS based at least in part on the first power control parameter for the TTI. In some examples of the method, apparatus, and non-transitory computer-readable medium described above, the second power control parameter may be determined based at least in part on: a semi-static relationship between the first power control parameter and the second control parameter, or a variable structure of the PUSCH in the UpPTS.

Some examples of the method, apparatus, and non-transitory computer-readable medium described above may further include processes, features, means, instructions, or code for receiving scheduling information for the PUSCH in the UpPTS, in which the scheduling information includes a first offset that differs from a second offset for at least one UCI type configuration received for an uplink subframe.

Some examples of the method, apparatus, and computer-readable medium described above may further include processes, features, means, instructions, or code for determining, based at least in part on a number of reference symbols to be transmitted in the UpPTS, whether to enable at least one of: frequency hopping during transmission of the PUSCH in the UpPTS, use of an orthogonal cover code (OCC) during transmission of the PUSCH in the UpPTS, or a combination thereof.

Some examples of the method, apparatus, and computer-readable medium described above may further include processes, features, means, instructions, or code for transmitting a random access preamble, and receiving, in response to transmitting the random access preamble, a random access response message scheduling the PUSCH in the UpPTS.

Some examples of the method, apparatus, and computer-readable medium described above may further include processes, features, means, instructions, or code for transmitting a demodulation reference signal (DM-RS) for the PUSCH in the UpPTS based at least in part on a DM-RS pattern that differs from a DM-RS pattern used for a PUSCH in an uplink subframe.

In one example, a method for wireless communication at a network access device is described. The method may include determining whether to schedule a transmission of UCI on a PUSCH in a UpPTS of a subframe, scheduling the PUSCH in the UpPTS based at least in part on the determining, and transmitting, to a UE, scheduling information for the PUSCH in the UpPTS.

In one example, an apparatus for wireless communication at a network access device is described. The apparatus may include means for determining whether to schedule a transmission of UCI on a PUSCH in a UpPTS of a subframe, means for scheduling the PUSCH in the UpPTS based at least in part on the determining, and means for transmitting, to a UE, scheduling information for the PUSCH in the UpPTS.

In one example, another apparatus for wireless communication at a network access device is described. The apparatus may include a processor, and memory in electronic communication with the processor. The processor and the memory may be configured to determine whether to schedule a transmission of UCI on a PUSCH in a UpPTS of a subframe, schedule the PUSCH in the UpPTS based at least in part on the determining, and transmit, to a UE, scheduling information for the PUSCH in the UpPTS.

In one example, a non-transitory computer-readable medium storing computer-executable code for wireless communication at a network access device is described. The code may be executable by a processor to determine whether to schedule a transmission of UCI on a PUSCH in a UpPTS of a subframe, schedule the PUSCH in the UpPTS based at least in part on the determining, and transmit, to a UE, scheduling information for the PUSCH in the UpPTS.

Some examples of the method, apparatus, and non-transitory computer-readable medium described above may further include processes, features, means, instructions, or code for selecting a timing of a TTI in which the scheduling information is transmitted based at least in part on a latency reduction capability of the UE. In some examples of the method, apparatus, and non-transitory computer-readable medium described above, the latency reduction capability of the UE may include at least one of: a scheduling timing reduction capability, a TTI duration reduction capability, or a combination thereof. In some examples of the method, apparatus, and non-transitory computer-readable medium described above, the timing of the TTI in which the scheduling information is transmitted may include: a leading boundary occurring at least two subframes prior to the UpPTS, or a leading boundary occurring at least 2.5 subframes prior to the UpPTS.

Some examples of the method, apparatus, and non-transitory computer-readable medium described above may further include processes, features, means, instructions, or code for at least one of: separately managing uplink HARQ for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, transmitting the uplink HARQ for the PUSCH in the UpPTS and the uplink HARQ for PUSCH transmissions in uplink TTIs asynchronously, or transmitting an acknowledgement of the PUSCH in the UpPTS in a same set of PHICH resources used to acknowledge PUSCH transmissions in uplink subframes.

Some examples of the method, apparatus, and non-transitory computer-readable medium described above may further include processes, features, means, instructions, or code for transmitting DCI to the UE, and indicating a presence of an uplink grant for the PUSCH in the UpPTS, in the DCI, based at least in part on: a state of an information field included in the DCI, a masking of a control channel including the DCI with a predetermined CRC mask, an association of the uplink grant with a predetermined decoding candidate, a size of the DCI, an identifier of a subframe in which the DCI is received, a DCI format, or a combination thereof.

Some examples of the method, apparatus, and non-transitory computer-readable medium described above may further include processes, features, means, instructions, or code for selecting a first offset for the scheduling information, in which the first offset differs from a second offset for at least one UCI type configuration selected for an uplink subframe, and indicating the first offset in the scheduling information.

Some examples of the method, apparatus, and non-transitory computer-readable medium described above may further include processes, features, means, instructions, or code for receiving a random access preamble, and scheduling the PUSCH in the UpPTS in response to receiving the random access preamble.

Some examples of the method, apparatus, and non-transitory computer-readable medium described above may further include processes, features, means, instructions, or code for receiving a DM-RS for the PUSCH in the UpPTS based at least in part on a DM-RS pattern that differs from a DM-RS pattern used for a PUSCH in an uplink subframe.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2 shows a set of time domain duplexing (TDD) radio frame structures that may be supported by the wireless communication devices (e.g., base stations and user equipment (UEs)) of a wireless communication system, in accordance with various aspects of the present disclosure;

DETAILED DESCRIPTION

Techniques are described in which an uplink pilot time slot (UpPTS), such as a six symbol period UpPTS, is used by user equipment (UEs) to transmit a physical uplink shared channel PUSCH. Some techniques are directed to the selection of a timing (e.g., the selection of a subframe or other transmission time interval (TTI)) for transmitting/receiving scheduling information for a PUSCH transmitted in a UpPTS. In some examples, the selection of a timing for transmitting/receiving scheduling information for a PUSCH in a UpPTS may be based at least in part on a capability of a UE. Some techniques are directed to determining whether to transmit uplink control information (UCI) on a PUSCH in a UpPTS. In some examples, a determination of whether to transmit UCI on a PUSCH in a UpPTS may be based at least in part on whether a UE is operating in a carrier aggregation mode. Some techniques are directed to differentiating an uplink grant for a PUSCH in a UpPTS from uplink grants for other uplink transmissions, such as an uplink transmission in an immediate next uplink TTI following a PUSCH in a UpPTS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the operations of the described methods may be performed in an order different from that described, and various operations may be added, omitted, or combined. Also, features described with respect to some examples may be combined in other examples.

Figure 1:
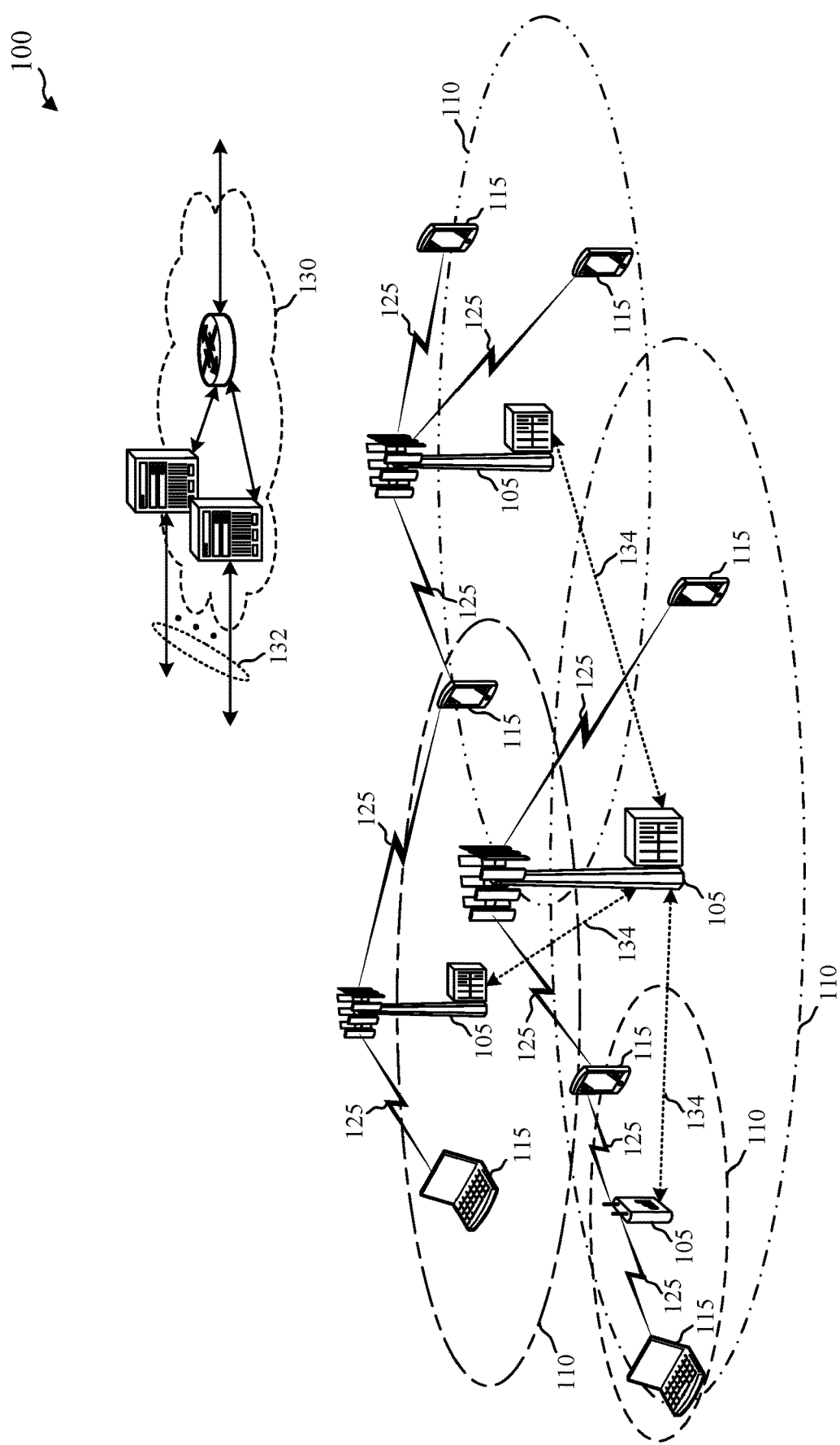
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include network access devices (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell may additionally or alternatively cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a TDD operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

FIG. 2 shows a set of TDD radio frame structures 200 that may be supported by the wireless communication devices (e.g., base stations and UEs) of a wireless communication system, in accordance with various aspects of the present disclosure. In some examples, the wireless communication system may be an example of aspects of the wireless communication system 100 described with reference to FIG. 1.

In some examples, the TDD radio frame structures may include sets of subframes (e.g., ten subframes, numbered 0-9) configured in accordance with different TDD DL-UL subframe configurations (e.g., 7 different TDD DL-UL subframe configurations, numbered 0-6). In some examples, the TDD DL-UL subframe configurations may include subsets of DL-UL UL subframe configurations associated with different switch-point periodicities. For example, a first subset of DL-UL subframe configurations may be associated with a 5 millisecond (ms) switch-point periodicity, and a second subset of DL-UL subframe configurations may be associated with a 10 ms switch-point periodicity. Each DL-UL subframe configuration in the first subset of DL-UL subframe configurations may include a number of downlink (D) subframes, a number of uplink (U) subframes, and two special (S) subframes. Each DL-UL subframe configuration in the second subset of DL-UL subframe configurations may include a number of D subframes, a number of U subframes, and one S subframe. Each S subframe may provide a transition between a downlink burst (e.g., one or more D subframes) and an uplink burst (e.g., one or more U subframes).

Figure 3:
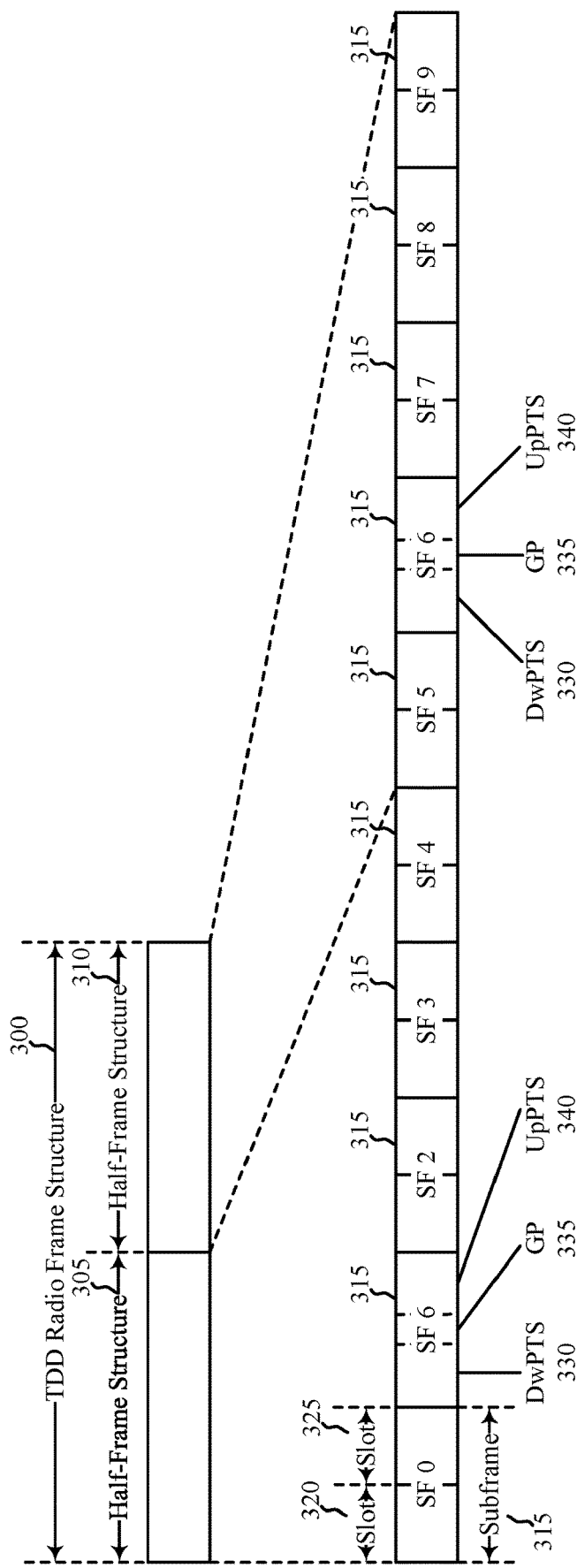
FIG. 3 shows a TDD radio frame structure having a downlink-uplink (DL-UL) subframe configuration associated with a 5 ms switch-point periodicity, in accordance with various aspects of the present disclosure.

FIG. 3 shows a TDD radio frame structure 300 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 0, 1, 2, or 6 in FIG. 2.

In some examples, the TDD radio frame structure 300 may include a first half-frame structure 305 followed by a second half-frame structure 310. Each of the first half-frame structure 305 and the second half-frame structure 310 may have a duration equal to half the duration of the TDD radio frame structure 300. In some examples, each of the first half-frame structure 305 and the second half-frame structure 310 may have the same structure and may include a subset of five subframes 315 (e.g., subframes 315 numbered 0, 1, 2, 3, and 4, or subframes 315 numbered 5, 6, 7, 8, and 9).

In some examples, each of the subframes 315 configured as a downlink subframe or an uplink subframe (e.g., subframes (SFs) 315 numbered 0, 2, 3, 4, 5, 7, 8, and 9) may include a first slot 320 followed by a second slot 325. Each of the first slot 320 and the second slot 325 may have a slot duration equal to half the duration of a subframe. In some examples, each of the subframes 315 configured as a special subframe (e.g., subframes 315 numbered 2 and 6) may include a downlink pilot time slot (DwPTS) 330, a guard period (GP) 335, and an uplink pilot time slot (UpPTS) 340, wherein the guard period can provide for a transition gap from downlink to uplink in the TDD mode.

In some wireless communications systems, it may be possible to dynamically adapt the DL-UL subframe configuration used by the wireless communication system (or a subset of devices (e.g., base stations and UEs) of the wireless communication system) based at least in part on the DL-UL traffic needs of the wireless communication system. A wireless communication system employing evolved interference management for traffic adaptation (eIMTA) may perform such an adaptation. For example, if a large data burst on a downlink is needed for a short duration, the TDD radio frame structure used for communication between a subset of wireless communication devices in a wireless communication system may be changed from the DL-UL subframe configuration numbered 1 in FIG. 2 (with a 6:4 DL:UL ratio) to the DL-UL subframe configuration numbered 5 in FIG. 2 (with a 9:1 DL:UL ratio). In some examples, the DL-UL subframe configuration employed for communication may be adapted no slower than 640 ms, and as fast as 10 ms.

The use of different DL-UL subframe configurations by different cells may in some cases result in inter-cell interference. For example, inter-cell interference may result from a first cell employing a first DL-UL subframe configuration including a D subframe in a subframe number n, and a second cell employing a second DL-UL subframe configuration including a U subframe in the subframe number n.

In some examples, a base station may provide a dynamic indication of the DL-UL subframe configuration employed. The dynamic indication may be provided by explicit layer signaling of a reconfiguration in a UE-group-common physical downlink control channel (PDCCH) or enhanced PDCCH (EPDCCH).

The adaptation of DL-UL subframe configurations based at least in part on traffic needs may increase the complexity of HARQ management. In some examples, HARQ management may be simplified by identifying one or more reference DL-UL subframe configurations for HARQ. For example, for UL HARQ, scheduling and HARQ timing may be based on a DL-UL subframe configuration indicated in a system information block (SIB) (e.g., a DL-UL subframe configuration indicated in a SIB1). For DL HARQ, scheduling and HARQ timing may be based on a reference DL-UL subframe configuration indicated for use by a UE (e.g., the DL-UL subframe configuration numbered 2, 4, or 5 in FIG. 2).

In wireless communication systems employing eIMTA, some subframes (e.g., some subframe numbers) may be subject to dynamic adaptation in transmission direction, while other subframes may not be subject to dynamic adaptation in transmission direction. For example, D subframes in a DL-UL subframe configuration indicated in a SIB1 may not be subject to dynamic adaptation in transmission direction, and U subframes in a DL-UL subframe configuration indicated for use by a UE for DL HARQ may not be subject to dynamic adaptation in transmission direction.

The UpPTS 340 described with reference to FIG. 3 may have different durations. In some examples, the UpPTS 340 may have a duration of one or two symbols (e.g., one or two orthogonal frequency-division multiplexing (OFDM) symbol periods or single-carrier frequency division multiplexing (SC-FDM) symbol periods). In these examples, the UpPTS 340 may be used to carry a shortened physical random access channel (PRACH) (e.g., a LTE/LTE-A PRACH format 4) and/or a sounding reference signal (SRS), but no physical uplink control channel (PUCCH) transmission or physical uplink shared channel (PUSCH) transmission. In other examples, the UpPTS 340 may have a longer duration (e.g., a six symbol period (e.g., six symbol period) duration). In these examples, the UpPTS 340 may provide more SRS transmission opportunities (e.g., for 3D-MIMO applications) or be used to carry a PUSCH transmission.

In some examples, a PUSCH to be transmitted in a UpPTS (i.e., a PUSCH in a UpPTS) may be separately scheduled from a UL transmission in an immediate next UL subframe. Scheduling a PUSCH in a UpPTS separately from other UL transmissions can provide greater scheduling flexibility. In some examples, however, the timing of a transmission of scheduling information for a PUSCH in a UpPTS may be tied to the timing of a transmission of scheduling information for a UL transmission in an immediate next UL subframe (e.g., both sets of scheduling information may be transmitted during a same TTI or on a same channel). The transmission of scheduling information for both a PUSCH in a UpPTS and a UL transmission in an immediate next UL subframe, in a same TTI, may reduce a UE's lead time for preparing to transmit the PUSCH in the UpPTS (e.g., in a radio frame structure based on 1 ms subframes (or 1 ms TTIs), the UE's lead time for preparing to transmit the PUSCH in the UpPTS may be reduced by 0.5 ms when the duration of the PUSCH in the UpPTS is 0.5 ms).

When a UpPTS in which a PUSCH is transmitted has a duration that is less than a first duration of a first TTI associated with a first radio frame structure (e.g., less than a duration of a LTE/LTE-A subframe), and less than a second duration of a second TTI associated with a second radio frame structure (e.g., less than a duration of an ultra low latency (ULL) TTI, or less than a duration of a slot of a LTE/LTE-A subframe), the timing of a transmission of scheduling information for the PUSCH in the UpPTS may vary depending on a UE's capability to operate in accordance with the first radio frame structure or the second radio frame structure. The timing of the transmission of scheduling information for the PUSCH in the UpPTS may also vary depending on a UE's processing capabilities. In some examples, the timing of a TTI in which the scheduling information for the PUSCH in the UpPTS is transmitted or received (e.g., the timing of a leading boundary of the TTI) may be based at least in part on a latency reduction capability of the UE. A latency reduction capability may include, for example, at least one of a scheduling timing reduction capability, a TTI duration reduction capability, or a combination thereof.

Figure 4:
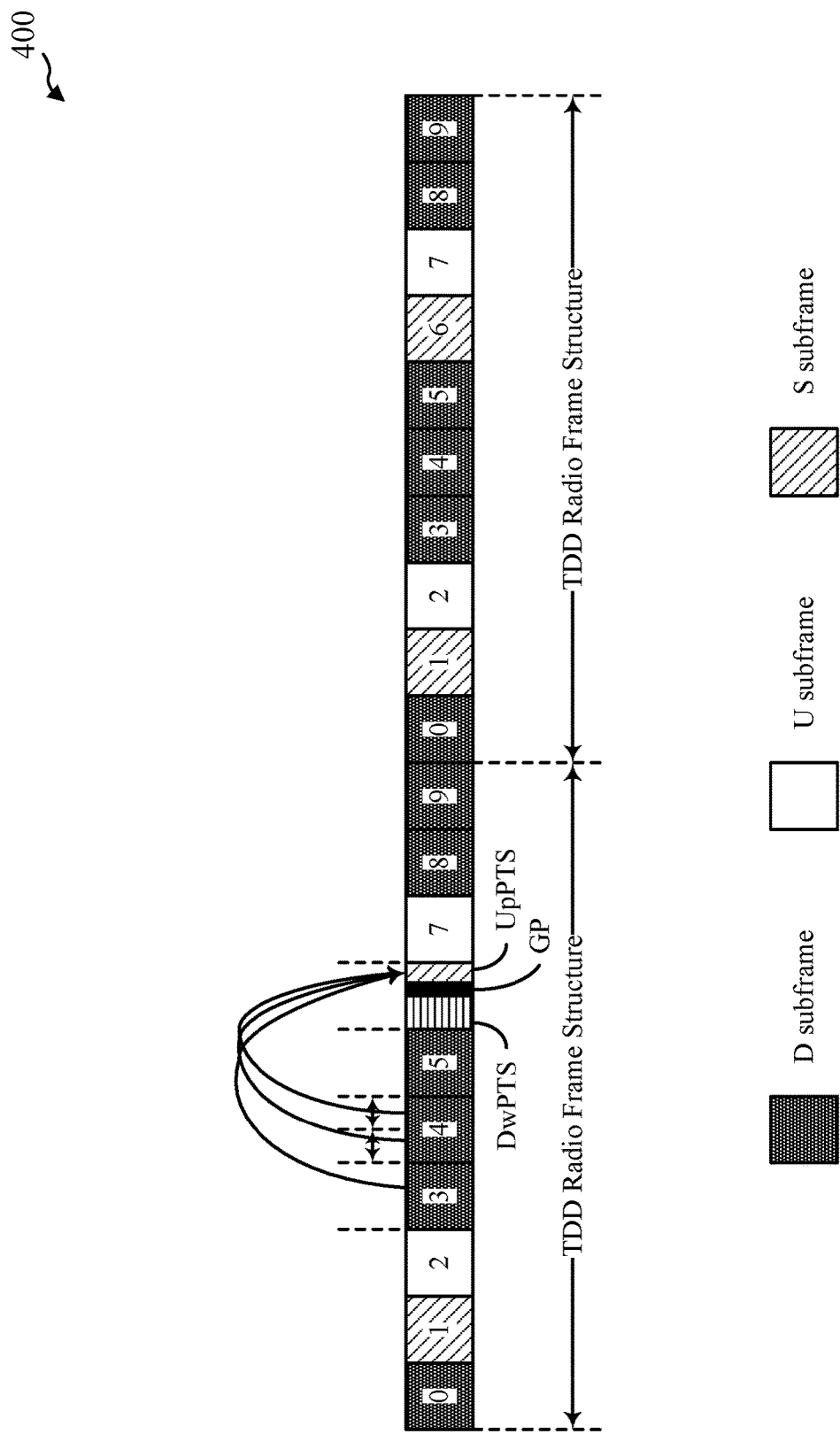
FIG. 4 shows a TDD radio frame structure having a DL-UL subframe configuration associated with a 5 ms switch-point periodicity, in accordance with various aspects of the present disclosure.

FIG. 4 shows a TDD radio frame structure 400 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 2 in FIG. 2. As shown, the DL-UL subframe configuration may include D subframes, U subframes, and S subframes. An uplink transmission (e.g., a PUSCH) may be scheduled for transmission in a UpPTS (e.g., a six symbol period UpPTS) of each S subframe.

An uplink transmission (e.g., a PUSCH) in each of the U subframes may be scheduled, at least in part, based on an uplink grant transmitted in an earlier-transmitted D subframe. A PUSCH in a six symbol period UpPTS in each of the S subframes may also be scheduled, at least in part, based on an uplink grant transmitted in an earlier-transmitted subframe.

For a LTE/LTE-A UE that is not capable of latency reduction (e.g., a UE that does not have a latency reduction capability, a UE that does not have a ULL latency reduction capability, and/or a UE that is associated with a n+4 scheduling timing in which scheduling information for UL subframes is transmitted four subframes before a UL SF n), scheduling information for the PUSCH in the UpPTS in SF 6 may be transmitted/received during SF 3, such that the scheduling information for the PUSCH in the UpPTS is transmitted/received in a TTI having a leading boundary occurring at least 3.5 subframes prior to the UpPTS in SF 6. Scheduling information for a UL transmission in the immediate next UL subframe following the UpPTS (i.e., SF 7) may also be transmitted/received during SF 3, such that the scheduling information for the UL transmission in the immediate next UL subframe following the UpPTS is transmitted/received in a TTI having a leading boundary occurring at least four subframes prior to SF 7. In some examples, the scheduling information for the PUSCH in the UpPTS may be transmitted in a PDCCH but not an EPDCCH in SF 3, to provide the LTE/LTE-A UE enough time to decode and process the scheduling information for the PUSCH in the UpPTS.

For a LTE/LTE-A UE that is capable of latency reduction (e.g., a UE that has a scheduling time reduction capability, such as a n+3 scheduling timing reduction capability in which scheduling information for UL subframes is transmitted three subframes before a UL SF n), scheduling information for the PUSCH in the UpPTS in SF 6 may be transmitted/received during SF 4, such that the scheduling information for the PUSCH in the UpPTS is transmitted/received in a TTI having a leading boundary occurring at least 2.5 subframes prior to the UpPTS in SF 6. In some examples, scheduling information for a UL transmission in the immediate next UL subframe following the UpPTS (i.e., SF 7) may also be transmitted/received during SF 4, such that the scheduling information for the UL transmission in the immediate next UL subframe following the UpPTS is transmitted/received in a TTI having a leading boundary occurring at least three subframes prior to SF 7. In some examples, the scheduling information for the PUSCH in the UpPTS may be transmitted in a PDCCH but not an EPDCCH in SF 4, to provide the LTE/LTE-A UE enough time to decode and process the scheduling information for the PUSCH in the UpPTS. Alternatively, scheduling information for the PUSCH in the UpPTS in SF 6 and/or scheduling information for a UL transmission in SF 7 may be transmitted/received in SF 3, similarly to how scheduling information may be transmitted for a LTE/LTE-A UE that is not capable of latency reduction.

For a ULL UE that is capable of latency reduction (e.g., a UE that has a TTI duration reduction capability), scheduling information for the PUSCH in the UpPTS in SF 6 may be transmitted/received during the second slot of SF 4, such that the scheduling information for the PUSCH in the UpPTS is transmitted/received in a TTI having a leading boundary occurring at least 2 subframes (or four 0.5 ms ULL TTIs) prior to the UpPTS in SF 6. In some examples, the scheduling information for the PUSCH in the UpPTS may be transmitted in a PDCCH or an EPDCCH in SF 4. Alternatively, scheduling information for the PUSCH in the UpPTS in SF 6 and/or scheduling information for a UL transmission in SF 7 may be transmitted/received in SF 3 or SF 4 similarly to how scheduling information may be transmitted for a LTE/LTE-A UE that is not capable of latency reduction or a LTE/LTE-A UE that has a scheduling timing reduction capability.

Shortening the scheduling timing for a PUSCH in a UpPTS (e.g., shortening the time between transmitting/receiving scheduling information and the time for receiving/transmitting the PUSCH in the UpPTS) when operating in a CA mode may raise UCI transmission issues related to CA. For example, a CC other than a CC that carries the PUSCH in the UpPTS may determine that UCI should be transmitted on the PUSCH in the UpPTS, and the time that a UE may need to prepare the UCI for transmission on the PUSCH in the UpPTS may be greater than the lead time that the scheduling timing provides. In some examples, such a scenario may be avoided by not allowing transmissions of UCI on a PUSCH in a UpPTS, and transmitting UCI on a PUCCH or PUSCH carried by a CC other than the CC that carries the PUSCH in the UpPTS. Additionally or alternatively, the probability of UCI being transmitted on a PUSCH in a UpPTS may be reduced by biasing the selection of a CC for carrying UCI away from a CC carrying a PUSCH in a UpPTS.

In some examples, HARQ for a PUSCH in a UpPTS may be jointly managed with HARQ for a UL transmission in a UL subframe (e.g., HARQ for a PUSCH in a UpPTS and HARQ for a transmission in a UL subframe may be mixed when the HARQ is for transmissions in a same transport block). Joint management, however, may undesirably increase HARQ overhead in some subframes of some configurations of a TDD radio frame structure (e.g., for UL heavy configurations). In some examples, HARQ for a PUSCH in a UpPTS may be separately managed from HARQ for a UL transmission in a UL subframe (e.g., HARQ for a PUSCH in a UpPTS and HARQ for a transmission in a UL subframe may not be mixed when the HARQ is for transmissions in a same transport block). In some examples, HARQ for a PUSCH in a UpPTS and/or HARQ for a UL transmission in a UL subframe may be transmitted/received asynchronously. In this case of asynchronous HARQ operation, a HARQ process identity may be included in the control information scheduling PUSCH to indicate the HARQ process with which a PUSCH transmission is associated.

When scheduling information for a PUSCH in a UpPTS and scheduling information for a UL transmission in a UL subframe may both be transmitted/received in a same TTI, a base station and UE may use various methods to differentiate, within downlink control information (DCI), a first UL grant for the PUSCH in the UpPTS from a second UL grant for the UL transmission in the UL subframe. In some examples, DCI including the first UL grant for the PUSCH may be associated with a DCI format 0 or DCI format 4, and the second UL grant for the UL transmission in the UL subframe may be associated with a format, denoted for convenience of exposition as DCI format 0' or DCI format 4'.

In some examples, a UL grant for a PUSCH in a UpPTS may be identified (e.g., differentiated from a UL grant for a UL transmission in a UL subframe) by one or more of: a state of an information field included in DCI, a masking of a control channel including DCI with a predetermined cyclic redundancy check (CRC) mask, an association of a UL grant with a predetermined decoding candidate, a size of the DCI containing a UL grant, an identifier of a subframe in which DCI containing a UL grant is received, a DCI format, or a combination thereof.

In examples in which a UL grant for a PUSCH in a UpPTS is identified based at least in part on a state of an information field included in DCI, the information field may include, for example, a UL index or a DL assignment index (DAI). In some examples, a UL index of 00 may identify a UL grant for a PUSCH in a UpPTS. For example, a UL index of 00 is applicable to TDD DL-UL subframe configuration 0 in FIG. 2. In some examples, a DAI not used for a particular TDD DL-UL subframe configuration may be used to identify a UL grant for a PUSCH in a UpPTS (e.g., for TDD DL-UL subframe configuration 6 in FIG. 2, without FDD/TDD CA, or without TDD of different configurations, DAI=1 or DAI=4 may be used, and DAI=2 and DAI=3 may not be used).

In examples in which a UL grant for a PUSCH in a UpPTS is identified based at least in part on a masking (or non-masking) of a control channel including DCI (including the UL grant) with a predetermined CRC mask, the UL grant may be transmitted in accordance with DCI format 0' or DCI format 4' and be scrambled by the CRC mask 0000 0000 0000 0001. When using CRC masking to identify a UL grant for a PUSCH in a UpPTS, indications of antenna switching based on CRC masking may be prohibited, or may made using different CRC masking than is used for identifying a UL grant for a PUSCH in a UpPTS.

In examples in which a UL grant for a PUSCH in a UpPTS is identified based at least in part on its association with a predetermined decoding candidate (e.g., a decoding candidate having a predetermined length and beginning at a predetermined resource element (RE)), the UL grant may be transmitted in accordance with a single predetermined decoding candidate, or may be transmitted in accordance with a decoding candidate selected from a plurality of predetermined decoding candidates allocated for transmissions of UL grants for a PUSCH in a UpPTS. Other predetermined decoding candidates may be allocated for transmitting a UL grant for a UL transmission in a UL subframe.

In examples in which a UL grant for a PUSCH in a UpPTS is identified based at least in part on a size of the DCI containing the UL grant, DCI format 0 and DCI format 0' may be differentiated by increasing or decreasing the size of one of the formats (e.g., by extending or contracting an existing information field or fields), and DCI format 4 and DCI format 4' may be differentiated by increasing or decreasing the size of one the formats. In some examples, the size of a DCI format may be increased or decreased to match the size of another DCI format (e.g., the size of DCI format 1A may be increased or decreased to match the size of an increased or decreased DCI format 0 size). To limit the number of blind decodes that a UE may have to perform, increasing or decreasing the size of a DCI format compared to the size of another DCI format may be combined with a restriction on the number of decoding candidates associated with one or more resource aggregation levels.

In examples in which a UL grant for a PUSCH in a UpPTS is identified based at least in part on an identifier of a subframe in which DCI containing a UL grant is received, a UL grant for a PUSCH in a UpPTS may be transmitted in accordance with DCI format 0 or DCI format 4 in a first TTI associated with a first identifier, and a UL grant for a UL transmission in a UL subframe may be transmitted in accordance with DCI format 0' or DCI format 4' in a second TTI associated with a second identifier. However, for a TDD DL-UL subframe configuration such as the TDD DL-UL subframe configuration 0 or 6 in FIG. 2, a different method of identifying a UL grant for a PUSCH in a UpPTS may be necessary, because the number of subframes available for PUSCH transmissions exceeds the number of subframes available to carry UL grants.

In examples in which a UL grant for a PUSCH in a UpPTS is identified based at least in part on a DCI format associated with the UL grant, the set of DCI formats that may be used for transmission of the UL grant may be restricted. For example, DCI format 0' may be used or DCI format 4' may be used, but a base station may not be allowed to select a DCI format from a set of DCI formats including both DCI format 0' and DCI format 4'.

In some examples, a technique for differentiating a UL grant for a PUSCH in a UpPTS from a UL grant for a UL transmission in a UL subframe may be used for a TTI in which both types of UL grant are transmitted (or expected to be transmitted), but may not be used for other TTIs.

In some examples, a power control parameter for a PUSCH in a UpPTS may be based at least in part on a power control parameter for a TTI. For example, a power control parameter for the PUSCH in the UpPTS may be based at least in part on a semi-static relationship (e.g., an offset) between a first power control parameter for the TTI and a second power control parameter for the PUSCH in the UpPTS (e.g., the second control parameter may be based at least in part on a value of the first power control parameter, multiplied by a ratio of a fixed duration of the PUSCH in the UpPTS to a fixed duration of the TTI). As another example, a power control parameter for the PUSCH in the UpPTS may be based at least in part on a variable structure of the PUSCH in the UpPTS (e.g., a second control parameter for the PUSCH in the UpPTS may be based at least in part on a value of a first power control parameter for a UL transmission in a UL subframe, multiplied by a ratio of a duration of the PUSCH in the UpPTS to a duration of the TTI).

Examples of UCI include periodic channel state information (P-CSI), aperiodic channel state information (A-CSI), a scheduling request (SR), and acknowledgement/non-acknowledgement (ACK/NAK) data. With respect to a PUSCH in a UpPTS, P-CSI to be transmitted on the PUSCH in the UpPTS may come from a CC carrying the PUSCH in the UpPTS, and when operating in a CA mode, from other CCs. Similarly, A-CSI transmitted on the PUSCH to be transmitted on the PUSCH in the UpPTS may come from a CC carrying the PUSCH in the UpPTS, and when operating in a CA mode, from other CCs. In some examples, SRs may not be transmitted on the CC carrying the PUSCH in the UpPTS, and may instead be transmitted on a PCC, which PCC is not the CC carrying the PUSCH in the UpPTS. When DL HARQ timing remains unchanged regardless of whether a PUSCH may be transmitted in a UpPTS, ACK/NAK data may not be transmitted on a PUSCH in a UpPTS.

In some examples, the transmission of UCI (e.g., P-CSI and A-CSI) on a PUSCH in a UpPTS may be supported (or allowed) regardless of whether a CC other than a CC carrying the PUSCH in the UpPTS is available to carry the UCI. In other examples, the transmission of UCI (e.g., P-CSI and A-CSI) on a PUSCH in a UpPTS may not be supported (or not allowed) when a CC other than the CC carrying the PUSCH in the UpPTS is available to carry the UCI (e.g., when an uplink TTI is scheduled to be transmitted on at least a first CC while the PUSCH in the UpPTS is transmitted on a second CC, as may be the case when operating in a CA mode).

In some examples, whether or not to support transmission of UCI (e.g., P-CSI and A-CSI) on a PUSCH in a UpPTS may be dependent on whether or not the UE is configured for parallel PUCCH and PUSCH transmission. If the UE is not configured for parallel PUCCH and PUSCH transmission, and if the PUSCH in a UpPTS is the only PUSCH transmission across two or more CCs in a group configured for carrier aggregation or dual-connectivity for a UE, the PUSCH may be dropped and the UCI can be transmitted on a PUCCH channel. In other words, the UE may skip transmission of the only PUSCH in a group when there is also UCI due for transmission. The scheduled PUSCH in a UpPTS in such a case can be treated as an error case. Alternatively, if the PUSCH in a UpPTS is the only PUSCH transmission in a group across two or more CCs configured for carrier aggregation or dual-connectivity for a UE, the UCI may be included as part of the PUSCH in a UpPTS, instead of being transmitted on a PUCCH channel, in order to avoid parallel PUCCH and PUSCH transmission. If the UE is configured with parallel PUCCH and PUSCH transmission, the PUSCH in a UpPTS may or may not be involved in UCI transmission. If the PUSCH in a UpPTS is not to be used for transmitting UCI, a PUCCH channel can be transmitted along with the PUSCH in a UpPTS, thus resulting in parallel PUCCH and PUSCH transmission. If the PUSCH in a UpPTS is involved in transmitting UCI, the PUSCH in a UpPTS may transmit one or more UCIs, e.g. periodic CSI if due for transmission.

In some examples, a demodulation reference signal (DM-RS) for a PUSCH in an UpPTS may follow a legacy DM-RS, as in the regular UL subframes. Alternatively, the DM-RS pattern for the PUSCH in the UpPTS may use a different pattern. As an example, the DM-RS pattern may use a pattern similar to SRS, where a comb level 2 or 4 may be used. This may allow the DM-RS for the PUSCH in the UpPTS to be more efficiently multiplexed with SRS in the UpPTS.

In some examples, a physical HARQ indicator channel (PHICH) for non-adaptive re-transmissions of the PUSCH in a UpPTS may be located in a downlink subframe, where the same set of PHICH resources may be used to acknowledge PUSCH transmissions in one or more UL subframes. In order to differentiate PHICH resources for the PUSCH in a UpPTS and the PUSCH in a UL subframe, an additional offset may be introduced for determining the PHICH resource corresponding to the PUSCH in a UpPTS, in addition to other parameters for PHICH resource derivation, such as the starting PRB index of the PUSCH, the DM-RS cyclic shift of the PUSCH, etc.

Figure 5:
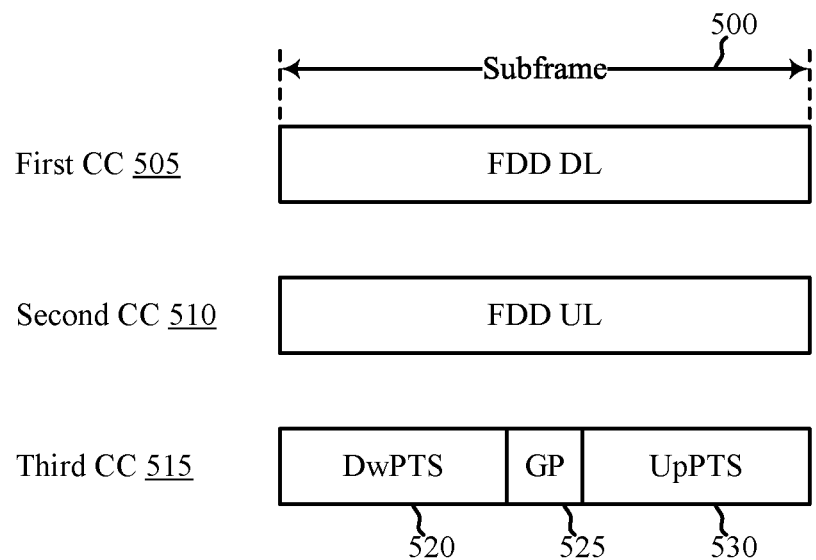
FIG. 5 shows a configuration of a subframe including multiple parallel component carriers (CCs), in accordance with various aspects of the present disclosure.

FIG. 5 shows a configuration of a subframe 500 including multiple parallel CCs, in accordance with various aspects of the present disclosure. By way of example, the CCs may include a first CC 505, a second CC 510, and a third CC 515. The first CC 505 may be configured for downlink use, and the second CC 510 may be configured for uplink use, in accordance with a FDD transmission mode between the first CC 505 and the second CC 510. The third CC 515 may be configured with a DwPTS 520, followed by a GP 525, followed by a UpPTS 530, in accordance with a TDD transmission mode on the third CC 515. A PUSCH may be transmitted in the UpPTS 530.

In some examples, a transmission of P-CSI, A-CSI, or other UCI on the PUSCH in the UpPTS 530 may not be supported. Thus, the PUSCH in the UpPTS 530 (or the third CC 515) may not be included in a prioritization of PUSCHs or PUCCHs (or CCs) from which a PUSCH or PUCCH (or CC) for carrying UCI may be selected. In FIG. 5, P-CSI, A-CSI, or other UCI may be transmitted on a PUSCH or PUCCH transmitted on the second CC 510. In some examples, the PUSCH in the UpPTS 530 may not be transmitted when P-CSI is transmitted on another CC and a UE is not configured for parallel PUCCH and/or PUSCH transmission.

In some examples, a transmission of P-CSI, A-CSI, or other UCI on the PUSCH in the UpPTS 530 may be supported. In these examples, the PUSCH in the UpPTS 530 (or the third CC 515) may be included in a prioritization of PUSCHs or PUCCHs (or CCs) from which a PUSCH or PUCCH (or CC) for carrying UCI may be selected, and a transmission of P-CSI, A-CSI, or other UCI may be made on the PUSCH in the UpPTS 530. In some examples, the PUSCH in the UpPTS 530 (or the third CC 515) may be assigned a lower cell index or lower priority in the prioritization of PUSCHs or PUCCHs (or CCs), which may decrease the probability of the PUSCH in the UpPTS 530 (or the third CC 515) from being selected to carry UCI when PUSCHs or PUCCHs (or other CCs, such as the second CC 510) are assigned a higher cell index or higher priority, and are available to carry UCI. Criteria other than cell index or priority may additionally or alternatively be used when selecting a PUSCH or PUCCH (or CC) to carry UCI.

When a transmission of P-CSI, A-CSI, or other UCI on the PUSCH in the UpPTS 530 is supported (or allowed), a first set of offsets may be configured for P-CSI, A-CSI, or other UCI transmitted on the PUSCH in the UpPTS 530. The first set of offsets may differ from a second set of offsets for at least one UCI type configuration for an uplink subframe. The first set of offsets may determine the amount of resources allocated for various UCI types that may be transmitted on the PUSCH in the UpPTS 530. In some examples, an offset may be a RRC-configured offset (e.g., a beta_offset). Offsets may include offsets for ACK/NAK data, channel quality indicator (CQI)/precoding matrix indicator (PMI), rank indicator (RI)/precoding type indicator (PTI), etc. In some examples, each offset may identify a number of REs allocated for a UCI type. The first set of offsets may be configured differently from the second set of offsets because the PUSCH in the UpPTS 530 may have a different amount of resources than a PUSCH in an uplink subframe. Some or all UCI types may be associated with two offsets. As an example, ACK/NAK and RI/PTI may be associated with two offsets—one for UL subframes and the other for UpPTS, while CQI may be associated with a single offset applicable to both UL subframes and UpPTS. As another example, all UCI types may be associated with two offsets—one for UL subframes and the other for UpPTS.

Figure 6:
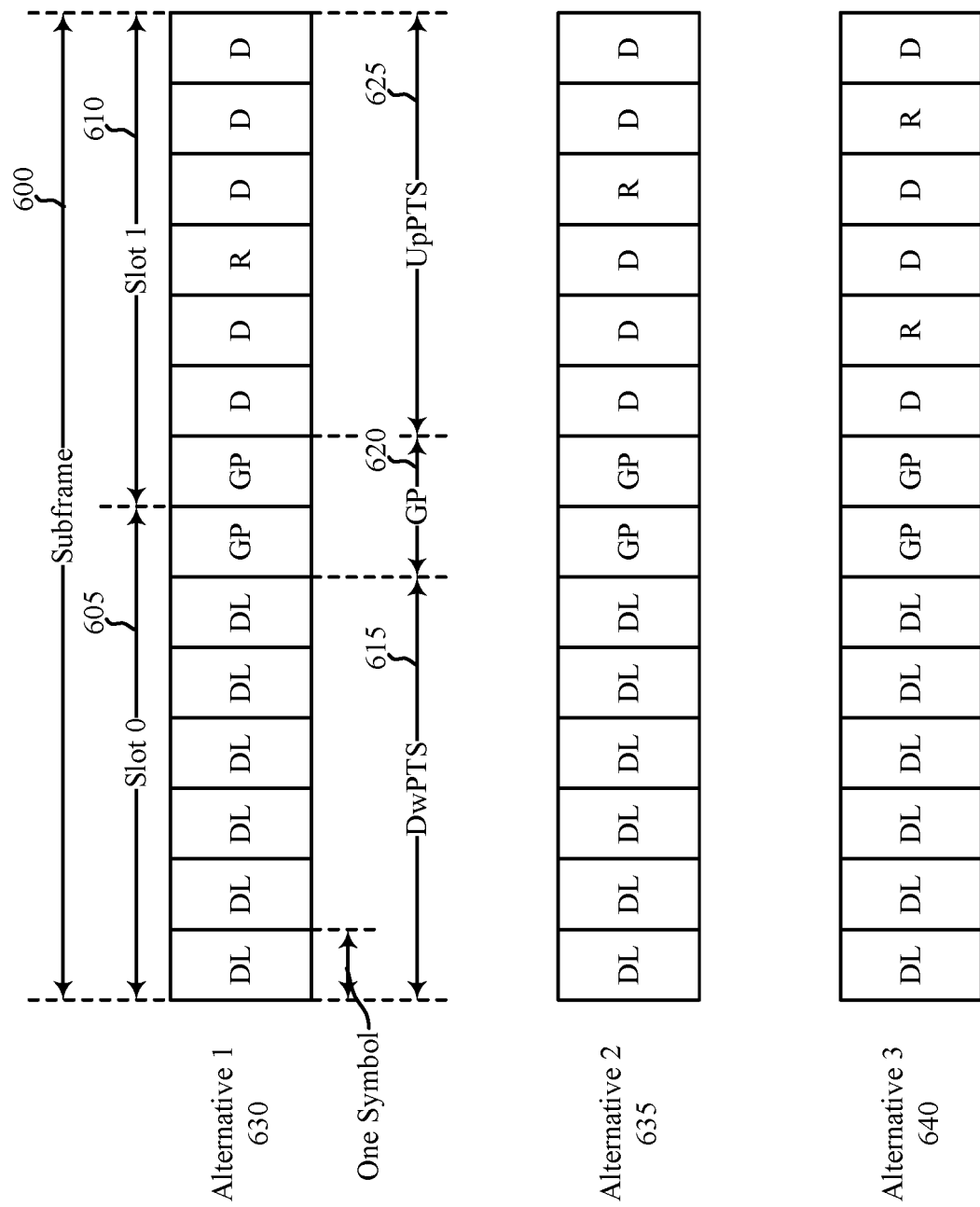
FIG. 6 shows alternative configurations of a subframe including a six symbol period uplink pilot time slot (UpPTS), in accordance with various aspects of the present disclosure.

FIG. 6 shows alternative configurations of a subframe 600 including a six symbol period UpPTS, in accordance with various aspects of the present disclosure. In some examples, the subframe 600 may be an example of aspects of one of the S subframes included in one of the DL-UL subframe configurations described with reference to FIG. 2. The subframe 600 may include a first slot 605 (Slot 0) followed by a second slot 610 (Slot 1). The subframe 600 may include a six symbol period DwPTS 615 within the first slot 605, followed by a two symbol GP 620 spanning the first slot 605 and the second slot 610, followed by a six symbol period UpPTS 625 within the second slot 610. A PUSCH may be transmitted in the six symbol period UpPTS 625. In some examples, the subframe 600 may have a duration of 1 ms.

In some examples, a subset of modulation symbols of a nominal PUSCH configuration for a slot may be mapped to the six symbol period UpPTS 625. In some examples, the subset of modulation symbols of the nominal PUSCH configuration for a slot may include a temporally last subset of modulation symbols of the nominal PUSCH configuration for the slot (e.g., a first symbol of a seven symbol nominal PUSCH configuration for a slot may not be mapped to the six symbol period UpPTS 625, resulting in a DDRDDD symbol pattern being transmitted during the six symbol period UpPTS 625, as shown in Alternative 1 630) or a temporally first subset of modulation symbols of the nominal PUSCH configuration for the slot (e.g., a last symbol of a seven symbol nominal PUSCH configuration for a slot may not be transmitted during the six symbol period UpPTS 625, resulting in a DDDRDD symbol pattern being transmitted during the six symbol period UpPTS 625, as shown in Alternative 2 635). The D symbols are PUSCH data symbols, and the R symbols are demodulation reference signal transmissions.

In some examples, a pattern of modulation symbols other than a subset of modulation symbols of a nominal PUSCH configuration for a slot may be mapped to the six symbol period UpPTS 625. For example, a demodulation reference signal transmission (R symbol) may be mapped to a temporally third symbol period of the six symbol period UpPTS 625, and PUSCH data symbols (D symbols) may be mapped to at least some of the other symbol periods of the six symbol period UpPTS 625, as shown in Alternative 1 630; or a demodulation reference signal transmission may be mapped to a temporally fourth symbol period of the six symbol period UpPTS 625, and PUSCH data symbols may be mapped to at least some of the other symbol periods of the six symbol period UpPTS 625, as shown in Alternative 2 635; or a demodulation reference signal transmission may be mapped to a temporally second symbol period and a temporally fifth symbol period of the six symbol period UpPTS 625, and PUSCH data symbols may be mapped to at least some of the other symbol periods of the six symbol period UpPTS 625, as shown in Alternative 3 640; or demodulation reference signals may be mapped to two symbol periods of the six symbol period UpPTS 625, and PUSCH data symbols may be mapped to at least some of the other symbol periods of the six symbol period UpPTS 625, as shown in Alternative 3 640; or a demodulation reference signal may be mapped to at least a temporally first symbol period of the six symbol period UpPTS 625, and PUSCH data symbols may be mapped to at least some of the other symbol periods of the six symbol period UpPTS 625 (not shown). Configurations in which demodulation reference signals are mapped to at least two symbol periods of the six symbol period UpPTS 625 may be useful in that other LTE/LTE-A PUSCH transmissions are transmitted over the two slots of a subframe, with one demodulation reference signal transmitted per slot. Additionally or alternatively, the use of some orthogonal cover codes (OCCs) used in MIMO transmissions may require the transmission of a demodulation reference signal during each of two symbol periods.

In some examples, a PUSCH may be transmitted during the six symbol period UpPTS 625 using one of a plurality of alternative data structures and demodulation reference signal structures (e.g., one of the data structures and demodulation reference signal structures associated with Alternative 1 630, Alternative 2 635, or Alternative 3 640), and a network access device (e.g., a base station) may transmit an indication of the data structure and the demodulation reference signal structure that a UE should use. The indication of the data structure and the demodulation reference signal structure may include, for example, at least one of a RRC configuration, or a dynamic indication in downlink control information (DCI), or a DCI format, or a combination thereof. In some examples, the dynamic indication in DCI may be implicit. For example, when DCI indicates single input, multiple output (SIMO) operation, the use of Alternative 1 630 may be implicitly indicated, or when DCI indicates MIMO operation, the use of Alternative 3 640 may be implicitly indicated.

In some examples, frequency hopping during transmission of a PUSCH in a UpPTS may be enabled (or disabled) based at least in part on a number of reference symbols to be transmitted in the UpPTS. With reference to FIG. 6, frequency hopping may not be enabled for a six symbol period UpPTS 625 that includes just one demodulation reference symbol transmission (e.g., a frequency hopping enablement bit may be set to a frequency hopping disabled state, or may not be transmitted, for Alternative 1 630 or Alternative 2 635). However, frequency hopping may be enabled for a six symbol period UpPTS 625 that includes two or more demodulation reference symbol transmissions (e.g., a frequency hopping enablement bit may or may not be set to a frequency hopping enabled state, or may be transmitted, for Alternative 3 640).

In some examples, multi-cluster resource allocation may or may not be supported for a PUSCH in a UpPTS (e.g., multi-cluster resource allocation may or may not be supported for any of Alternative 1 630, Alternative 2 635, or Alternative 3 640 in FIG. 6).

In some examples, the use of a cyclic shift or OCC index during transmission of a PUSCH in a UpPTS may be enabled (or disabled) based at least in part on a number of reference symbols to be transmitted in the UpPTS. With reference to FIG. 6, the use of a cyclic shift or OCC index may not be enabled for a six symbol period UpPTS 625 that includes just one demodulation reference symbol transmission (e.g., for Alternative 1 630 or Alternative 2 635). However, the use of a cyclic shift or OCC index may be enabled for a six symbol period UpPTS 625 that includes two or more demodulation reference symbol transmissions (e.g., for Alternative 3 640).

A PUSCH in a UpPTS may or may not be scheduled by a network access device in response to receiving a random access preamble (e.g., a Message 1 of a random access procedure) from a UE. When a PUSCH in a UpPTS is scheduled in response to receiving a random access preamble from a UE, scheduling information for the PUSCH in the UpPTS may be transmitted to the UE in a random access response message (e.g., a Message 3 of a random access procedure).

Figure 7:
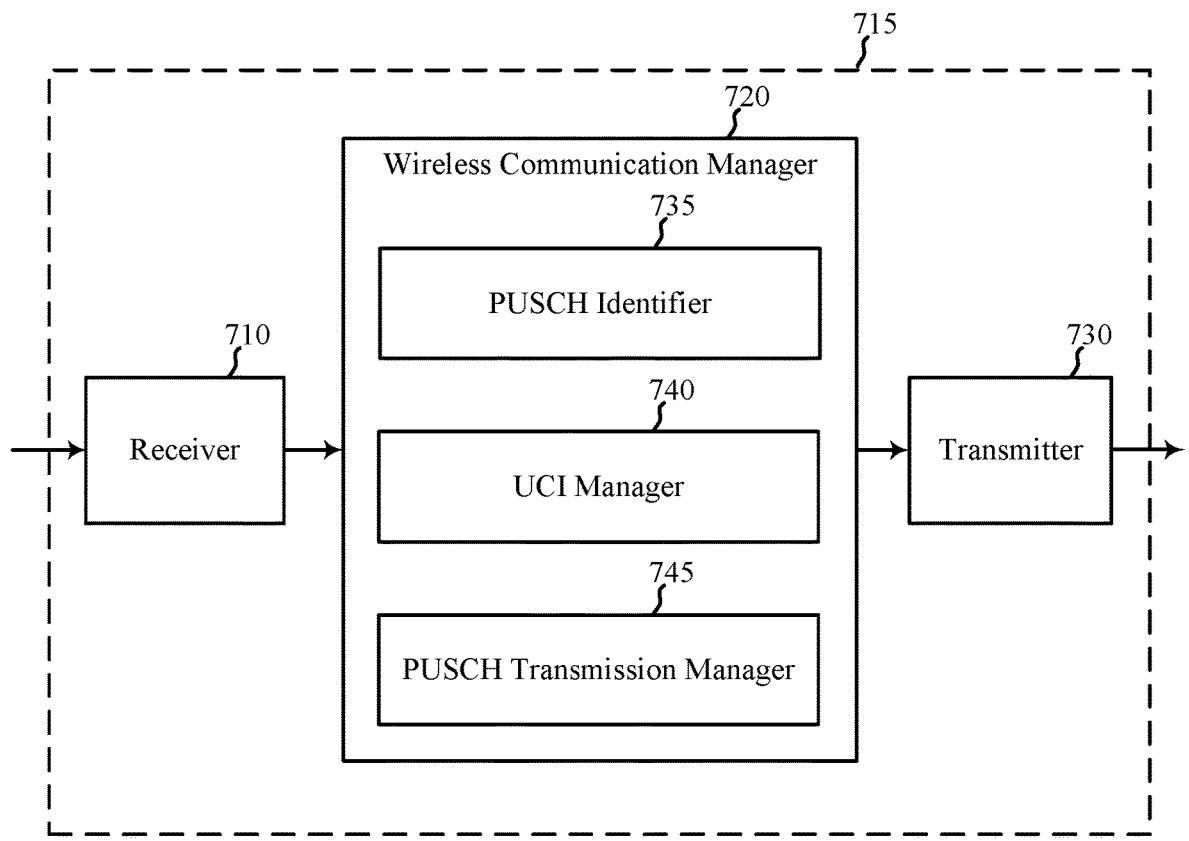
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115 described with reference to FIG. 1. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, 5, or 6. The receiver 710 may be used to receive various data or control signals (i.e., transmissions) over one or more communication links of a wireless communication system, such as one or more communication links of the wireless communication system 100 described with reference to FIG. 1.

In some examples, the transmitter 730 may include at least one RF transmitter, such as at least one RF transmitter operable to transmit over at least one radio frequency spectrum band. The transmitter 730 may be used to transmit various data or control signals (i.e., transmissions) over one or more communication links of a wireless communication system, such as one or more communication links of the wireless communication system 100 described with reference to FIG. 1.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include a PUSCH identifier 735, a UCI manager 740, or a PUSCH transmission manager 745.

The PUSCH identifier 735 may be used to identify a PUSCH to transmit in a UpPTS of a subframe. The UCI manager 740 may be used to determine whether to transmit UCI on the PUSCH in the UpPTS. The PUSCH transmission manager 745 may be used to transmit the PUSCH in the UpPTS based at least in part on the determination made by the UCI manager 740.

Figure 8:
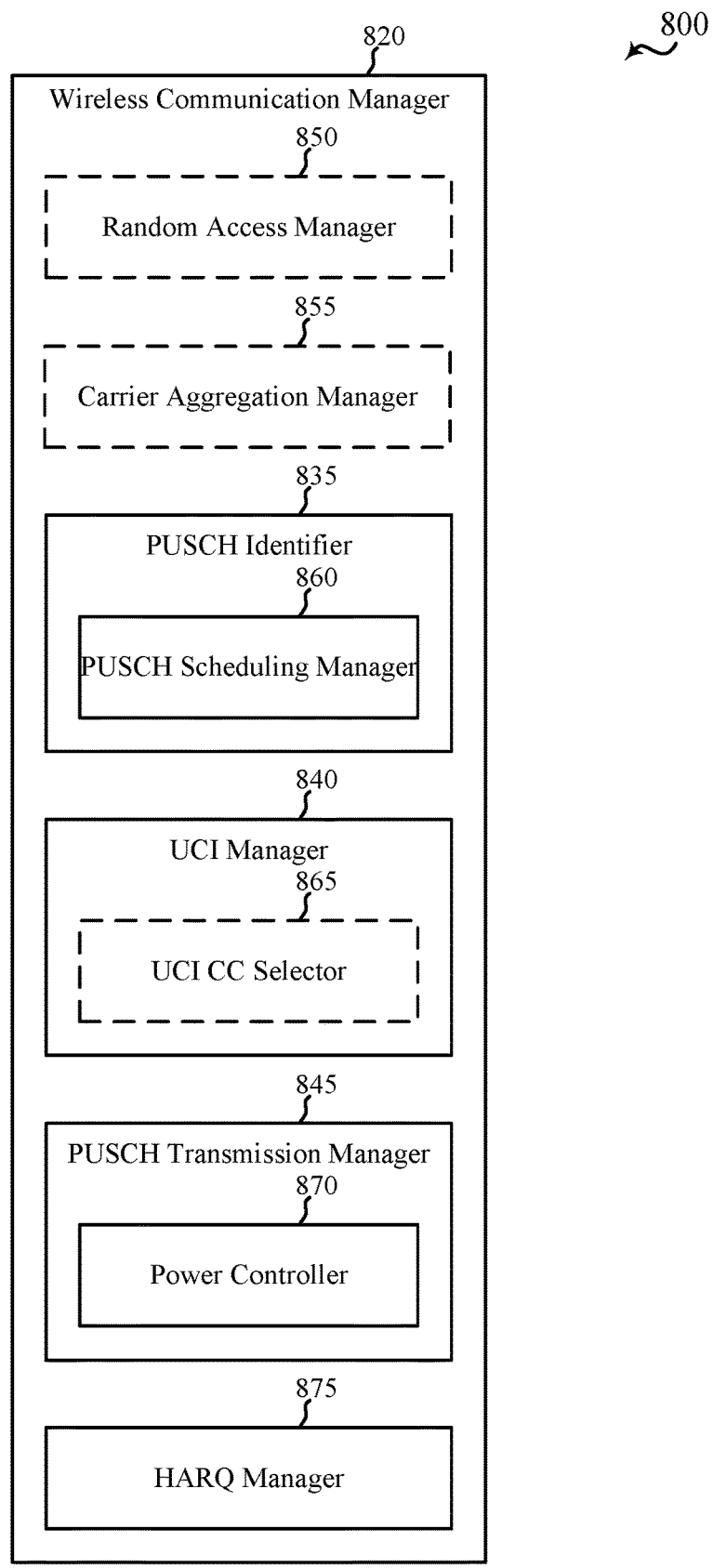
FIG. 8 shows a block diagram of a wireless communication manager for use in wireless communication, in accordance with various aspects of the present disclosure.

FIG. 8 shows a block diagram 800 of a wireless communication manager 820 for use in wireless communication, in accordance with various aspects of the present disclosure. The wireless communication manager 820 may be an example of aspects of the wireless communication manager 720 described with reference to FIG. 7.

The components of the wireless communication manager 820 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820 may be used to manage one or more aspects of wireless communication for a UE or apparatus, such as one of the UEs 115 described with reference to FIG. 1, or one of the apparatus 715 described with reference to FIG. 7. In some examples, part of the wireless communication manager 820 may be incorporated into or shared with a receiver or a transmitter (e.g., the receiver 710 or the transmitter 730 described with reference to FIG. 7). In some examples, the wireless communication manager 820 may include an optional random access manager 850, an optional carrier aggregation manager 855, a PUSCH identifier 835, a UCI manager 840, a PUSCH transmission manager 845, or a HARQ manager 875. The PUSCH identifier may include a PUSCH scheduling manager 860. The UCI manager 840 may include an optional UCI CC selector 865. The PUSCH transmission manager 845 may include a power controller 870.

The random access manager 850 may be used, under some conditions, to transmit a random access preamble.

The PUSCH identifier 835 may be used to identify a PUSCH to transmit in a UpPTS of a subframe.

The PUSCH scheduling manager 860 may be used to receive, during a TTI, scheduling information for the PUSCH in the UpPTS. A timing of the TTI may be based at least in part on a latency reduction capability of a UE that includes the wireless communication manager 820. In some examples, the latency reduction capability of the UE may include at least one of a scheduling timing reduction capability, a TTI duration reduction capability, or a combination thereof. In some examples, the timing of the TTI in which the scheduling information is received may include a leading boundary occurring at least two subframes prior to the UpPTS, or a leading boundary occurring at least 2.5 subframes prior to the UpPTS. In some examples, the scheduling information may include a first offset that differs from a second offset for at least one UCI type configuration received for an uplink subframe. In some examples, part or all of the scheduling information may be received in DCI or RRC signaling. In some examples, the PUSCH scheduling manager 860 may receive a random access response message scheduling the PUSCH in the UpPTS. The random access response message may be received in response to the random access manager 850 transmitting a random access preamble.

In some examples, the PUSCH scheduling manager 860 may be used to receive DCI. The DCI may be received as part of the received scheduling information. In some examples, the PUSCH scheduling manager 860 may identify an uplink grant for the PUSCH in the UpPTS, received in the DCI, based at least in part on a state of an information field included in the DCI, a masking of a control channel including the DCI with a predetermined CRC mask, an association of the uplink grant with a predetermined decoding candidate, a size of the DCI, an identifier of a subframe in which the DCI is received, a DCI format, or a combination thereof. In some examples, the PUSCH scheduling manager 860 may determine a size of the DCI. In some examples, the PUSCH scheduling manager 860 may identify, within the DCI, at least one decoding candidate for an uplink grant for the PUSCH in the UpPTS. The at least one decoding candidate may be based at least in part on the size of the DCI.

The carrier aggregation manager 855 may be used to determine whether an uplink TTI is scheduled to be transmitted on at least a first CC while the PUSCH in the UpPTS is transmitted on a second CC. Additionally or alternatively, the carrier aggregation manager 855 may be used to determine whether the PUSCH in the UpPTS is scheduled to be transmitted when operating in a carrier aggregation mode.

The UCI manager 840 may be used to determine whether to transmit UCI on the PUSCH in the UpPTS. In some examples, the determination made by the UCI manager 840 may be based at least in part on one of a determinations made by the carrier aggregation manager 855. For example, the UCI manager 840 may determine to transmit UCI on the PUSCH in the UpPTS when it is determined by the carrier aggregation manager 855 that an uplink TTI is scheduled to be transmitted at least the first CC. In some examples, the determination made by the UCI manager 840 may be based at least in part on a determination that the PUSCH in the UpPTS is scheduled to be transmitted when operating in a carrier aggregation mode. For example, when operating in a carrier aggregation mode, a determination may be made by the UCI manager 840 to not transmit, on the PUSCH in the UpPTS, at least one of periodic CSI, aperiodic CSI, UCI, or a combination thereof. When operating in a carrier aggregation mode, the determination made by the UCI manager 840 may additionally or alternatively include determining to transmit, in parallel with the PUSCH in the UpPTS, and on a CC that does not carry the PUSCH in the UpPTS, at least one of: periodic CSI, aperiodic CSI, UCI, or a combination thereof. Alternatively, when operating in a carrier aggregation mode, a determination may be made by the UCI manager 840 to transmit at least one of periodic CSI, aperiodic CSI, UCI, or a combination thereof on the PUSCH in the UpPTS.

The UCI CC selector 865 may be used to select a CC for transmitting UCI. In some examples, the CC may be selected based at least in part on a prioritization of CCs that biases CC selection away from a CC carrying the PUSCH in the UpPTS.

The power controller 870 may be used to identify a first power control parameter for a TTI, and determine a second power control parameter for the PUSCH in the UpPTS based at least in part on the first power control parameter for the TTI. In some examples, the second power control parameter may be determined based at least in part on a semi-static relationship between the first power control parameter and the second control parameter, or based at least in part on a variable structure of the PUSCH in the UpPTS.

The PUSCH transmission manager 845 may be used to transmit the PUSCH in the UpPTS based at least in part on a determination made by the UCI manager 840. In some examples, the PUSCH transmission manager 845 may additionally or alternatively be used to determine, based at least in part on a number of reference symbols to be transmitted in the UpPTS, whether to enable at least one of: frequency hopping during transmission of the PUSCH in the UpPTS, use of an OCC during transmission of the PUSCH in the UpPTS, or a combination thereof.

The HARQ manager 875 may be used to manage HARQ. In some examples, managing HARQ may include at least one of: separately managing uplink HARQ for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, or receiving the uplink HARQ for the PUSCH in the UpPTS and the uplink HARQ for PUSCH transmissions in uplink TTIs asynchronously.

Figure 9:
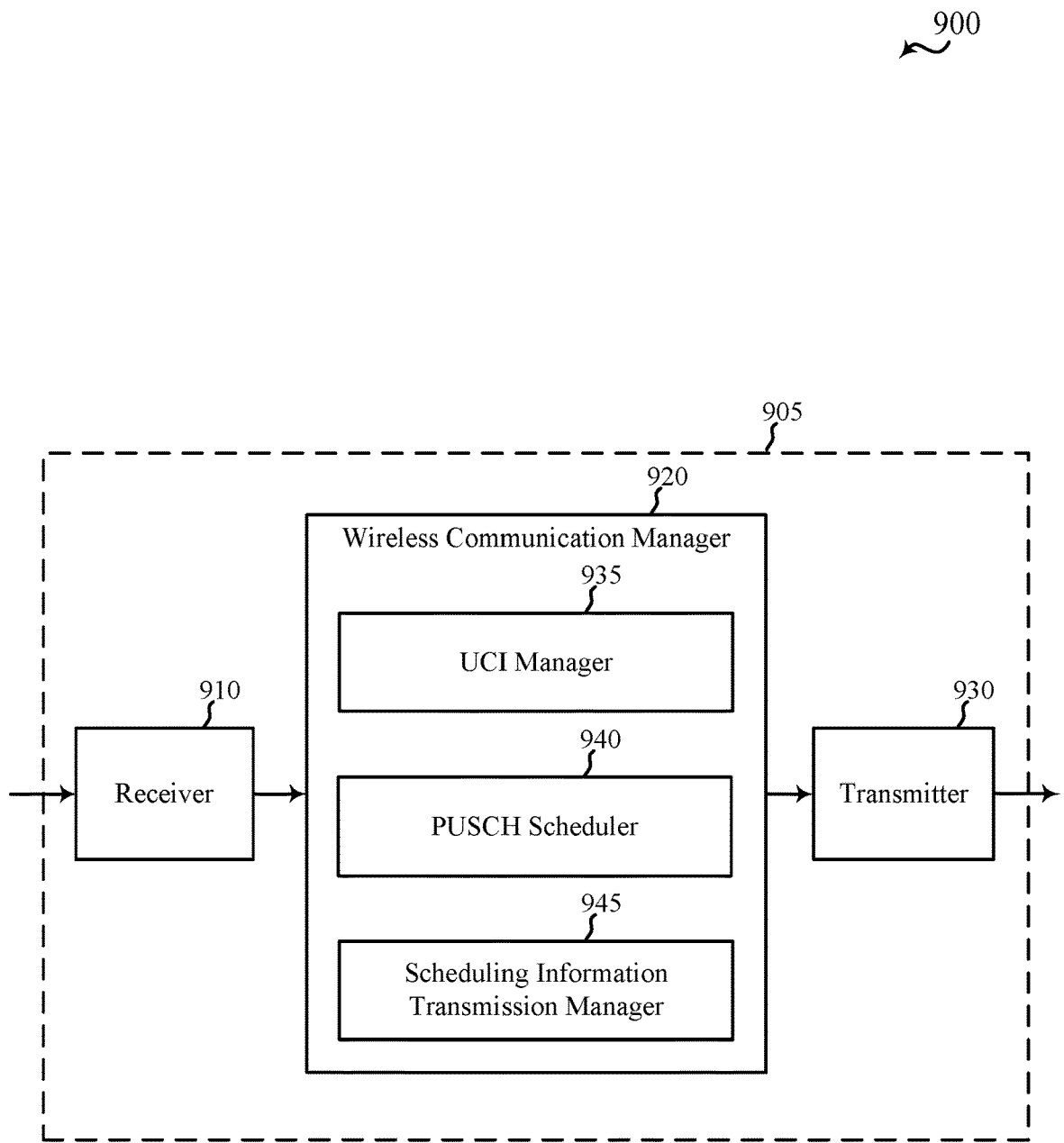
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of a network access device, such as one or more of the base stations 105 described with reference to FIG. 1. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, 5, or 6. The receiver 910 may be used to receive various data or control signals (i.e., transmissions) over one or more communication links of a wireless communication system, such as one or more communication links of the wireless communication system 100 described with reference to FIG. 1.

In some examples, the transmitter 930 may include at least one RF transmitter, such as at least one RF transmitter operable to transmit over at least one radio frequency spectrum band. The transmitter 930 may be used to transmit various data or control signals (i.e., transmissions) over one or more communication links of a wireless communication system, such as one or more communication links of the wireless communication system 100 described with reference to FIG. 1.

In some examples, the wireless communication manager 920 may be used to manage one or more aspects of wireless communication for the apparatus 905. In some examples, part of the wireless communication manager 920 may be incorporated into or shared with the receiver 910 or the transmitter 930. In some examples, the wireless communication manager 920 may include a UCI manager 935, a PUSCH scheduler 940, or a scheduling information transmission manager 945.

The UCI manager 935 may be used to determine whether to schedule a transmission of UCI on a PUSCH in a UpPTS of a subframe. The PUSCH scheduler 940 may be used to schedule the PUSCH in the UpPTS based at least in part on the determination made by the UCI manager 935. The scheduling information transmission manager 945 may be used to transmit, to a UE, scheduling information for the PUSCH in the UpPTS.

Figure 10:
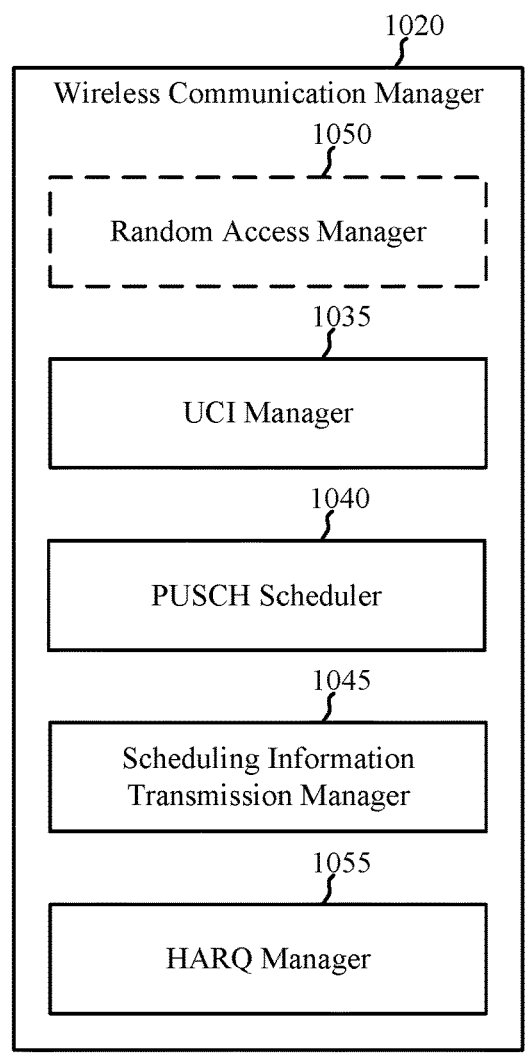
FIG. 10 shows a block diagram of a wireless communication manager for use in wireless communication, in accordance with various aspects of the present disclosure.

FIG. 10 shows a block diagram 1000 of a wireless communication manager 1020 for use in wireless communication, in accordance with various aspects of the present disclosure. The wireless communication manager 1020 may be an example of aspects of the wireless communication manager 920 described with reference to FIG. 9.

The components of the wireless communication manager 1020 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1020 may be used to manage one or more aspects of wireless communication for a network access device or apparatus, such as one of the base stations 105 described with reference to FIG. 1, or one of the apparatus 905 described with reference to FIG. 9. In some examples, part of the wireless communication manager 1020 may be incorporated into or shared with a receiver or a transmitter (e.g., the receiver 910 or the transmitter 930 described with reference to FIG. 9). In some examples, the wireless communication manager 1020 may include an optional random access manager 1050, a UCI manager 1035, a PUSCH scheduler 1040, a scheduling information transmission manager 1045, or a HARQ manager 1055.

The random access manager 1050 may be used to receive a random access preamble.

The UCI manager 1035 may be used to determine whether to schedule a transmission of UCI on a PUSCH in a UpPTS of a subframe.

The PUSCH scheduler 1040 may be used to schedule the PUSCH in the UpPTS based at least in part on the determination made by the UCI manager 935. In some examples, the PUSCH in the UpPTS may be scheduled in response to the random access manager 1050 receiving a random access preamble. In some examples, the PUSCH scheduler 1040 may select a first offset for scheduling information for the PUSCH in the UpPTS. In some examples, the first offset may differ from a second offset for at least one UCI type configuration selected for an uplink subframe.

The scheduling information transmission manager 1045 may be used to transmit, to a UE, scheduling information for the PUSCH in the UpPTS. In some examples, the first offset may be indicated in the scheduling information. In some examples, the scheduling information transmission manager 1045 may select a timing of a TTI in which the scheduling information for the PUSCH in the UpPTS is transmitted. The TTI may be selected based at least in part on a latency reduction capability of the UE. In some examples, the latency reduction capability of the UE may include at least one of a scheduling timing reduction capability, a TTI duration reduction capability, or a combination thereof. In some examples, the timing of the TTI in which the scheduling information is transmitted may include a leading boundary occurring at least two subframes prior to the UpPTS, or a leading boundary occurring at least 2.5 subframes prior to the UpPTS. In some examples, the scheduling information transmission manager 1045 may transmit DCI to the UE. In some examples, the scheduling information transmission manager 1045 may indicate the presence of an uplink grant for the PUSCH in the UpPTS in the DCI. The indication may be based at least in part on: a state of an information field included in the DCI, a masking of a control channel including the DCI with a predetermined CRC mask, an association of the uplink grant with a predetermined decoding candidate, a size of the DCI, an identifier of a subframe in which the DCI is received, a DCI format, or a combination thereof.

The HARQ manager 1055 may be used to manage HARQ. In some examples, managing HARQ may include at least one of: separately managing uplink HARQ for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, or transmitting the uplink HARQ for the PUSCH in the UpPTS and the uplink HARQ for PUSCH transmissions in uplink TTIs asynchronously.

Figure 11:
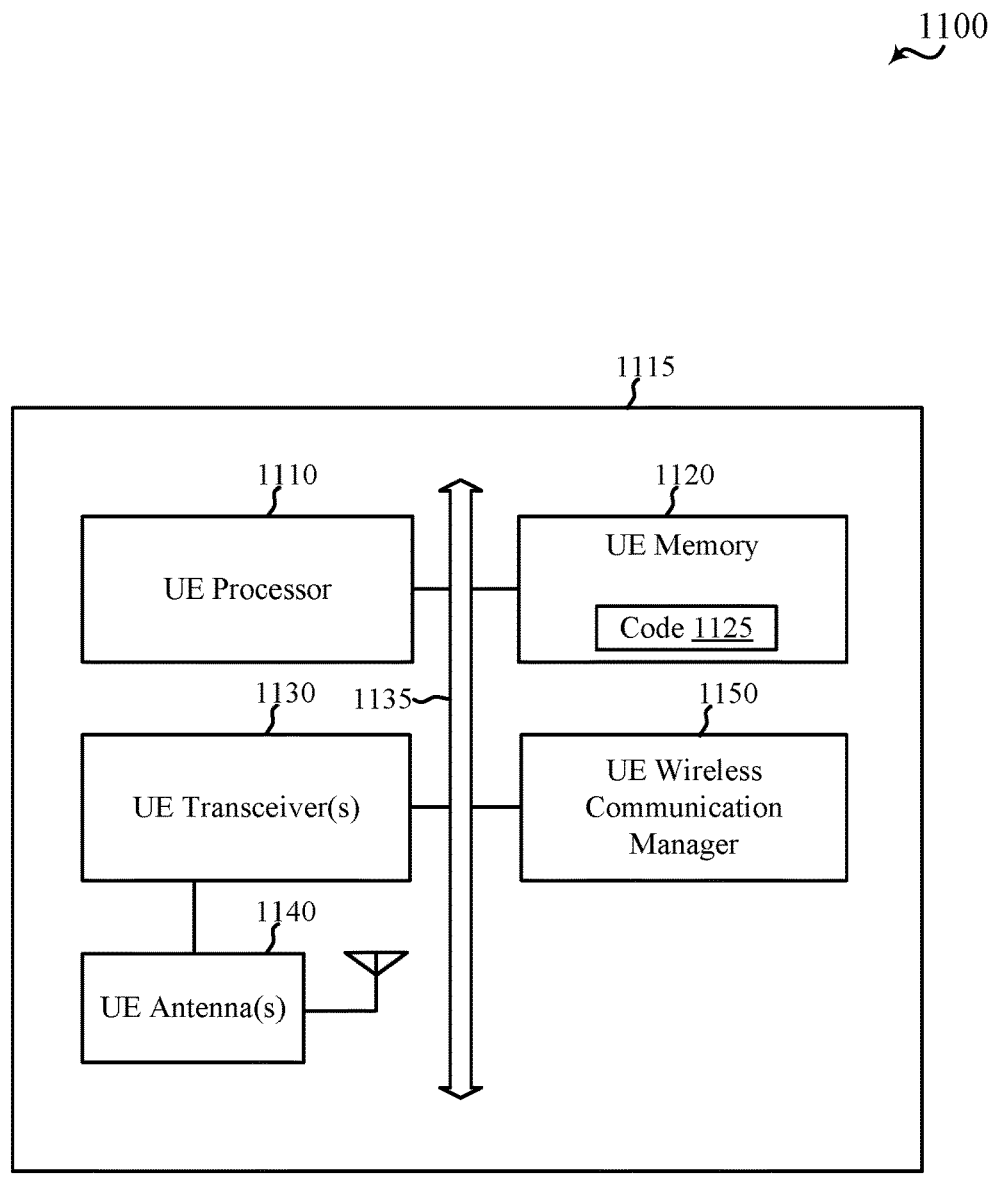
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115 described with reference to FIG. 1, or aspects of the apparatus 715 described with reference to FIG. 7. The UE 1115 may be configured to implement at least some of the UE features and functions described with reference to FIG. 1, 2, 3, 4, 5, 6, 7, or 8.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more UE buses 1135.

The UE memory 1120 may include random access memory (RAM) or read-only memory (ROM). The UE memory 1120 may store computer-readable, computer-executable code 1125 containing instructions that are configured to, when executed, cause the UE processor 1110 to perform various functions described herein related to wireless communication, including, for example, identifying a PUSCH to transmit in a UpPTS of a subframe, determining whether to transmit UCI on the PUSCH in the UpPTS, and transmitting the PUSCH in the UpPTS based at least in part on the determining. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a central processing unit (CPU), a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) one or more radio frequency spectrum bands.

The UE transceiver(s) 1130 may include a modem configured to modulate packets and provide the modulated packets to the UE antenna(s) 1140 for transmission, and to demodulate packets received from the antenna(s) 1140. The UE transceiver(s) 1130 may, in some examples, be implemented as one or more transmitters and one or more separate receivers. The UE transceiver(s) 1130 may support communications over one or more wireless communication links. The UE transceiver(s) 1130 may be configured to communicate bi-directionally, via the UE antenna(s) 1140, with one or more network access devices or other apparatuses, such as one or more of the base stations 105 described with reference to FIG. 1, or the apparatus 905 described with reference to FIG. 9. While the UE 1115 may include a single UE antenna, there may be examples in which the UE 1115 may include multiple UE antennas.

The UE wireless communication manager 1150 may be configured to perform or control some or all of the UE features or functions described with reference to FIG. 1, 2, 3, 4, 5, 6, 7, or 8. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager 720 or 820 described with reference to FIG. 7 or 8.

Figure 12:
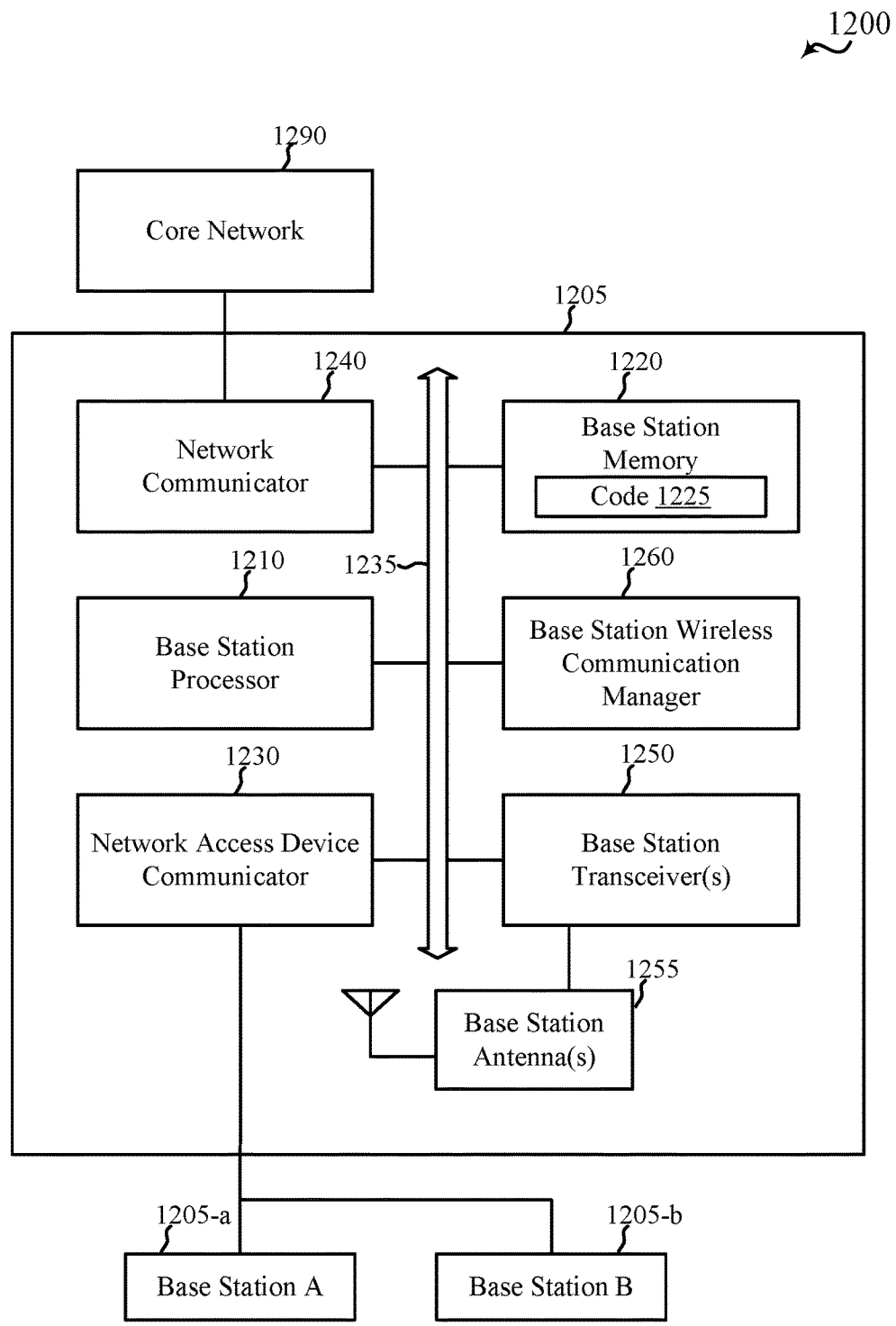
FIG. 12 shows a block diagram of a base station (e.g., a base station forming part or all of an eNB) for use in wireless communication, in accordance with various aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of aspects of one or more of the base stations 105 described with reference to FIG. 1, or aspects of the apparatus 1105 described with reference to FIG. 1. The base station 1205 may be configured to implement or facilitate at least some of the network access device or base station features and functions described with reference to FIG. 1, 2, 3, 4, 5, 6, 7, 8, 9, 10, 11, or 12.

The base station 1205 may include a base station processor 1210, a base station memory 1220, at least one base station transceiver (represented by base station transceiver(s) 1250), at least one base station antenna (represented by base station antenna(s) 1255), or a base station wireless communication manager 1260. The base station 1205 may also include one or more of a network access device communicator 1230 or a network communicator 1240. Each of these components may be in communication with each other, directly or indirectly, over one or more base station buses 1235.

The base station memory 1220 may include RAM or ROM. The base station memory 1220 may store computer-readable, computer-executable code 1225 containing instructions that are configured to, when executed, cause the base station processor 1210 to perform various functions described herein related to wireless communication, including, for example, determining whether to schedule a transmission of UCI on a PUSCH in a UpPTS of a subframe, scheduling the PUSCH in the UpPTS based at least in part on the determining, and transmitting, to a UE, scheduling information for the PUSCH in the UpPTS. Alternatively, the computer-executable code 1225 may not be directly executable by the base station processor 1210 but be configured to cause the base station 1205 (e.g., when compiled and executed) to perform various of the functions described herein.

The base station processor 1210 may include an intelligent hardware device, e.g., a CPU, a microcontroller, an ASIC, etc. The base station processor 1210 may process information received through the base station transceiver(s) 1250, the network access device communicator 1230, or the network communicator 1240. The base station processor 1210 may also process information to be sent to the base station transceiver(s) 1250 for transmission through the base station antenna(s) 1255, to the network access device communicator 1230, for transmission to one or more other network access devices (e.g., the base station 1205-a or the base station 1205-b), or to the network communicator 1240 for transmission to a core network 1290, which may be an example of one or more aspects of the core network 130 described with reference to FIG. 1. The base station processor 1210 may handle, alone or in connection with the base station wireless communication manager 1260, various aspects of communicating over (or managing communications over) one or more radio frequency spectrum bands.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more transmitters and one or more separate receivers. The base station transceiver(s) 1250 may support communication over one or more wireless communication links. The base station transceiver(s) 1250 may be configured to communicate bi-directionally, via the base station antenna(s) 1255, with one or more UEs or other apparatuses, such as one or more of the UEs 115 or 1115 described with reference to FIG. 1 or 11, or the apparatus 715, described with reference to FIG. 7. The base station 1205 may, for example, include multiple base station antennas (e.g., an antenna array). The base station 1205 may communicate with the core network 1290 through the network communicator 1240. The base station 1205 may also communicate with other network access devices, such as the base station 1205-a or the base station 1205-b, using the network access device communicator 1230.

The base station wireless communication manager 1260 may be configured to perform or control some or all of the network access device or base station features or functions described with reference to FIG. 1, 2, 3, 4, 5, 6, 9, or 10. The base station wireless communication manager 1260, or portions of it, may include a processor, or some or all of the functions of the base station wireless communication manager 1260 may be performed by the base station processor 1210 or in connection with the base station processor 1210. In some examples, the base station wireless communication manager 1260 may be an example of the wireless communication manager 920 or 1020 described with reference to FIG. 9 or 10.

Figure 13:
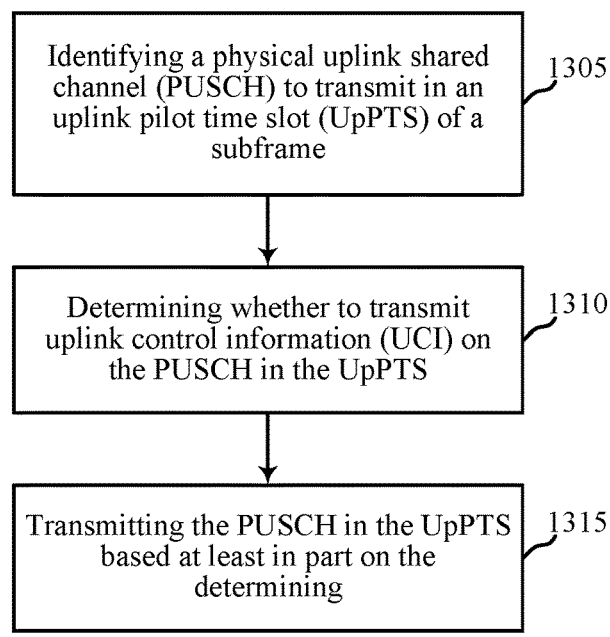
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to a UE including aspects of one or more of the UEs 115 or 1115 described with reference to FIG. 1 or 11, or aspects of the apparatus 715 described with reference to FIG. 7. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include identifying a PUSCH to transmit in a UpPTS of a subframe. The operations at block 1305 may be performed using the wireless communication manager 720 or 820 described with reference to FIG. 7 or 8, the UE wireless communication manager 1150 described with reference to FIG. 11, or the PUSCH identifier 735 or 835 described with reference to FIG. 7 or 8.

At block 1310, the method 1300 may include determining whether to transmit UCI on the PUSCH in the UpPTS. The operations at block 1310 may be performed using the wireless communication manager 720 or 820 described with reference to FIG. 7 or 8, the UE wireless communication manager 1150 described with reference to FIG. 11, or the UCI manager 740 or 840 described with reference to FIG. 7 or 8.

At block 1315, the method 1300 may include transmitting the PUSCH in the UpPTS based at least in part on the determination made at block 1310. The operations at block 1315 may be performed using the wireless communication manager 720 or 820 described with reference to FIG. 7 or 8, the UE wireless communication manager 1150 described with reference to FIG. 11, or the PUSCH transmission manager 745 or 845 described with reference to FIG. 7 or 8.

Figure 14:
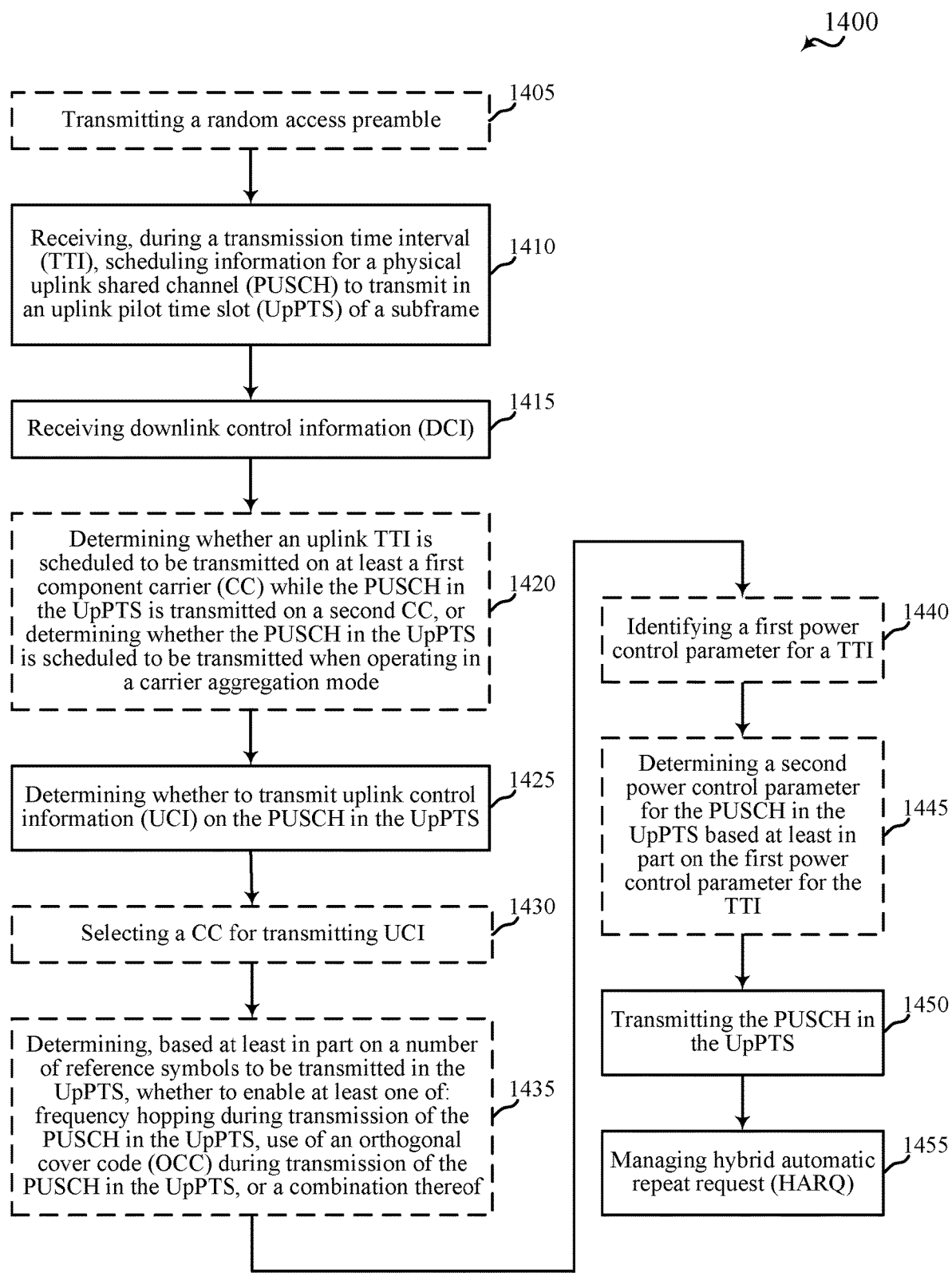
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to a UE including aspects of one or more of the UEs 115 or 1115 described with reference to FIG. 1 or 11, or aspects of the apparatus 715 described with reference to FIG. 7. In some examples, a UE may execute one or more sets of codes to control the functional elements of the UE to perform the functions described below. Additionally or alternatively, the UE may perform one or more of the functions described below using special-purpose hardware.

At block 1405, the method 1400 may optionally include transmitting a random access preamble. The operations at block 1405 may be performed using the wireless communication manager 720 or 820 described with reference to FIG. 7 or 8, the UE wireless communication manager 1150 described with reference to FIG. 11, or the random access manager 850 described with reference to FIG. 8.

At one or more of blocks 1410, 1415, or 1420, the method 1400 may include identifying a PUSCH to transmit in a UpPTS of a subframe. At block 1410, the method 1400 may include receiving, during a TTI, scheduling information for the PUSCH in the UpPTS. A timing of the TTI may be based at least in part on a latency reduction capability of the UE. In some examples, the latency reduction capability of the UE may include at least one of a scheduling timing reduction capability, a TTI duration reduction capability, or a combination thereof. In some examples, the timing of the TTI in which the scheduling information is received may include a leading boundary occurring at least two subframes prior to the UpPTS, or a leading boundary occurring at least 2.5 subframes prior to the UpPTS. In some examples, the scheduling information may include a first offset that differs from a second offset for at least one UCI type configuration received for an uplink subframe. In some examples, part or all of the scheduling information may be received in DCI or RRC signaling. In some examples, the operations at block 1410 may include receiving a random access response message scheduling the PUSCH in the UpPTS. The random access response message may be received in response to transmitting a random access preamble at block 1405. The operations at block 1410 may be performed using the wireless communication manager 720 or 820 described with reference to FIG. 7 or 8, the UE wireless communication manager 1150 described with reference to FIG. 11, the PUSCH identifier 735 or 835 described with reference to FIG. 7 or 8, or the PUSCH scheduling manager 860 described with reference to FIG. 8.

At block 1415, the method 1400 may include receiving DCI. In some examples, the DCI may be received as part of receiving the scheduling information at block 1410. In some examples, the operations at block 1415 may include identifying an uplink grant for the PUSCH in the UpPTS, received in the DCI, based at least in part on a state of an information field included in the DCI, a masking of a control channel including the DCI with a predetermined CRC mask, an association of the uplink grant with a predetermined decoding candidate, a size of the DCI, an identifier of a subframe in which the DCI is received, a DCI format, or a combination thereof. In some examples, the operations at block 1415 may include determining a size of the DCI. In some examples, the operations at block 1415 may include identifying, within the DCI, at least one decoding candidate for an uplink grant for the PUSCH in the UpPTS. The at least one decoding candidate may be based at least in part on the size of the DCI. The operations at block 1415 may be performed using the wireless communication manager 720 or 820 described with reference to FIG. 7 or 8, the UE wireless communication manager 1150 described with reference to FIG. 11, the PUSCH identifier 735 or 835 described with reference to FIG. 7 or 8, or the PUSCH scheduling manager 860 described with reference to FIG. 8.

At block 1420, the method 1400 may optionally include determining whether an uplink TTI is scheduled to be transmitted on at least a first CC while the PUSCH in the UpPTS is transmitted on a second CC, or determining whether the PUSCH in the UpPTS is scheduled to be transmitted when operating in a carrier aggregation mode. The operations at block 1420 may be performed using the wireless communication manager 720 or 820 described with reference to FIG. 7 or 8, the UE wireless communication manager 1150 described with reference to FIG. 11, or the carrier aggregation manager 855 described with reference to FIG. 8.

At block 1425, the method 1400 may include determining whether to transmit UCI on the PUSCH in the UpPTS. In some examples, the determination made at block 1425 may be based at least in part on one of the determinations made at block 1420. For example, the method 1400 may include determining to transmit UCI on the PUSCH in the UpPTS when it is determined at block 1420 that an uplink TTI is scheduled to be transmitted at least the first CC. In some examples, the determination made at block 1425 may be based at least in part on determining the PUSCH in the UpPTS is scheduled to be transmitted when operating in a carrier aggregation mode. For example, when operating in a carrier aggregation mode, a determination may be made at block 1425 to not transmit, on the PUSCH in the UpPTS, at least one of periodic CSI, aperiodic CSI, UCI, or a combination thereof. When operating in a carrier aggregation mode, the determination made at block 1425 may additionally or alternatively include determining to transmit, in parallel with the PUSCH in the UpPTS, and on a CC that does not carry the PUSCH in the UpPTS, at least one of: periodic CSI, aperiodic CSI, UCI, or a combination thereof. Alternatively, when operating in a carrier aggregation mode, a determination may be made at block 1425 to transmit at least one of periodic CSI, aperiodic CSI, UCI, or a combination thereof on the PUSCH in the UpPTS. The operations at block 1425 may be performed using the wireless communication manager 720 or 820 described with reference to FIG. 7 or 8, the UE wireless communication manager 1150 described with reference to FIG. 11, or the UCI manager 740 or 840 described with reference to FIG. 7 or 8.

At block 1430, the method 1400 may optionally include selecting a CC for transmitting UCI. In some examples, the CC may be selected based at least in part on a prioritization of CCs that biases CC selection away from a CC carrying the PUSCH in the UpPTS. The operations at block 1430 may be performed using the wireless communication manager 720 or 820 described with reference to FIG. 7 or 8, the UE wireless communication manager 1150 described with reference to FIG. 11, the UCI manager 740 or 840 described with reference to FIG. 7 or 8, or the UCI CC selector 865 described with reference to FIG. 8.

At block 1435, the method 1400 may optionally include determining, based at least in part on a number of reference symbols to be transmitted in the UpPTS, whether to enable at least one of: frequency hopping during transmission of the PUSCH in the UpPTS, use of an OCC during transmission of the PUSCH in the UpPTS, or a combination thereof. The operations at block 1435 may be performed using the wireless communication manager 720 or 820 described with reference to FIG. 7 or 8, the UE wireless communication manager 1150 described with reference to FIG. 11, or the PUSCH transmission manager 745 or 845 described with reference to FIG. 7 or 8.

At block 1440, the method 1400 may optionally include identifying a first power control parameter for a TTI. The operations at block 1425 may be performed using the wireless communication manager 720 or 820 described with reference to FIG. 7 or 8, the UE wireless communication manager 1140 described with reference to FIG. 11, the PUSCH transmission manager 745 or 845 described with reference to FIG. 7 or 8, or the power controller 870 described with reference to FIG. 8.

At block 1445, the method 1400 may optionally include determining a second power control parameter for the PUSCH in the UpPTS based at least in part on the first power control parameter for the TTI. In some examples, the second power control parameter may be determined based at least in part on a semi-static relationship between the first power control parameter and the second control parameter, or based at least in part on a variable structure of the PUSCH in the UpPTS. The operations at block 1425 may be performed using the wireless communication manager 720 or 820 described with reference to FIG. 7 or 8, the UE wireless communication manager 1145 described with reference to FIG. 11, the PUSCH transmission manager 745 or 845 described with reference to FIG. 7 or 8, or the power controller 870 described with reference to FIG. 8.

At block 1450, the method 1400 may include transmitting the PUSCH in the UpPTS based at least in part on the determination made at block 1425. The operations at block 1450 may be performed using the wireless communication manager 720 or 820 described with reference to FIG. 7 or 8, the UE wireless communication manager 1150 described with reference to FIG. 11, or the PUSCH transmission manager 745 or 845 described with reference to FIG. 7 or 8.

At block 1455, the method 1400 may include managing HARQ. In some examples, managing HARQ may include at least one of: separately managing uplink HARQ for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, or receiving the uplink HARQ for the PUSCH in the UpPTS and the uplink HARQ for PUSCH transmissions in uplink TTIs asynchronously. The operations at block 1455 may be performed using the wireless communication manager 720 or 820 described with reference to FIG. 7 or 8, the UE wireless communication manager 1150 described with reference to FIG. 11, or the HARQ manager 875 described with reference to FIG. 8.

Figure 15:
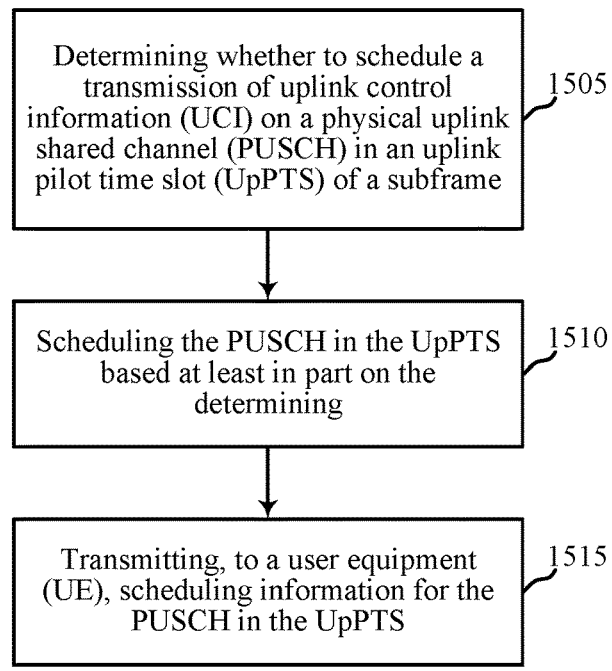
FIG. 15 is a flow chart illustrating an example of a method for wireless communication at a network access device (e.g., a base station), in accordance with various aspects of the present disclosure.

FIG. 15 is a flow chart illustrating an example of a method 1500 for wireless communication at a network access device (e.g., a base station), in accordance with various aspects of the present disclosure. For clarity, the method 1500 is described below with reference to a network access device including aspects of one or more of the base stations 105 or 1205 described with reference to FIG. 1 or 12, or aspects of the apparatus 905 described with reference to FIG. 9. In some examples, a base station may execute one or more sets of codes to control the functional elements of the base station to perform the functions described below. Additionally or alternatively, the base station may perform one or more of the functions described below using special-purpose hardware.

At block 1505, the method 1500 may include determining whether to schedule a transmission of UCI on a PUSCH in a UpPTS of a subframe. The operations at block 1505 may be performed using the wireless communication manager 920 or 1020 described with reference to FIG. 9 or 10, the base station wireless communication manager 1260 described with reference to FIG. 12, or the UCI manager 935 or 1035 described with reference to FIG. 9 or 10.

At block 1510, the method 1500 may include scheduling the PUSCH in the UpPTS based at least in part on the determining. The operations at block 1510 may be performed using the wireless communication manager 920 or 1020 described with reference to FIG. 9 or 10, the base station wireless communication manager 1260 described with reference to FIG. 12, or the PUSCH scheduler 940 or 1040 described with reference to FIG. 9 or 10.

At block 1515, the method 1500 may include transmitting, to a UE, scheduling information for the PUSCH in the UpPTS. The operations at block 1515 may be performed using the wireless communication manager 920 or 1020 described with reference to FIG. 9 or 10, the base station wireless communication manager 1260 described with reference to FIG. 12, or the scheduling information transmission manager 945 or 1045 described with reference to FIG. 9 or 10.

Figure 16:
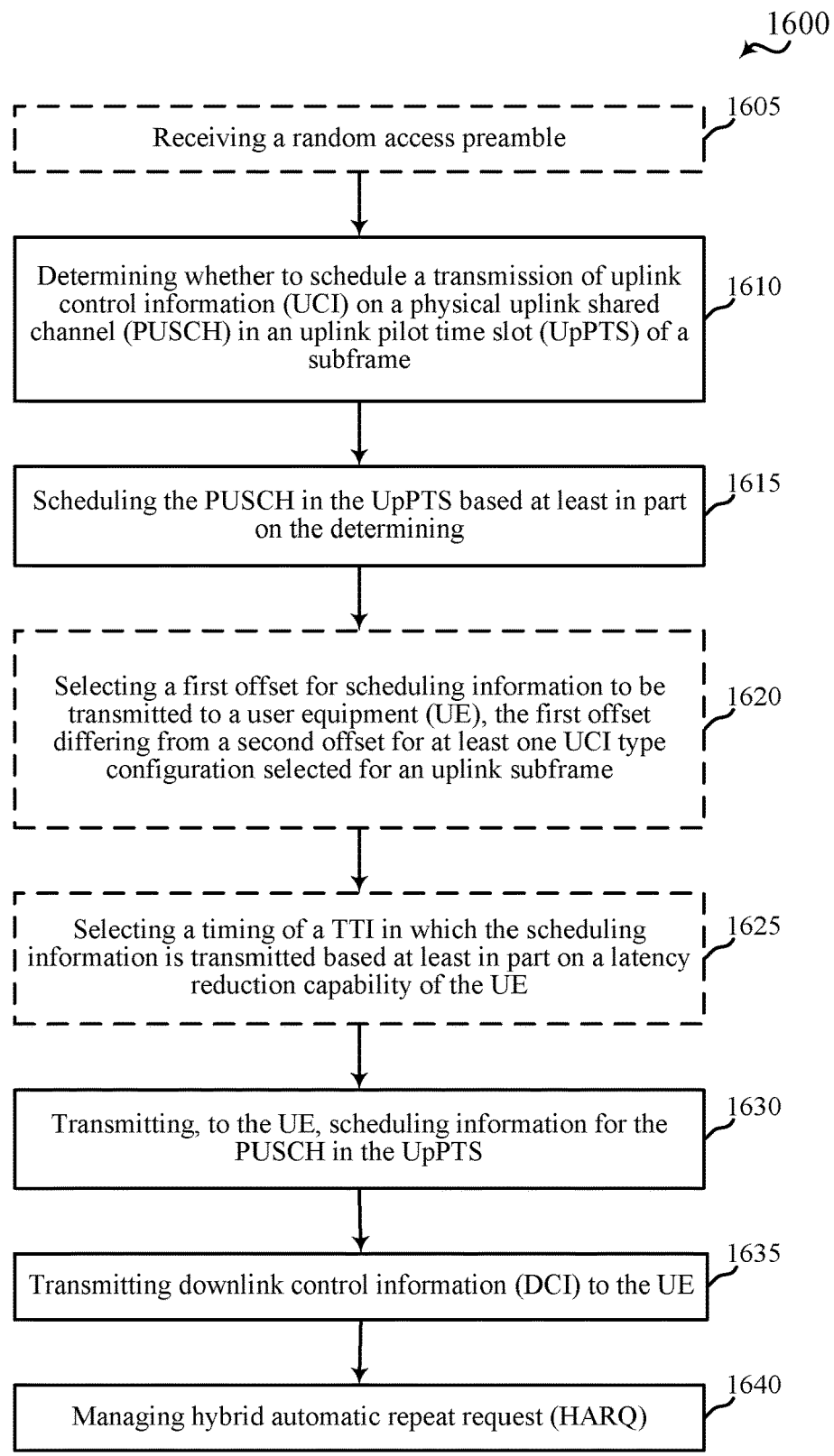
FIG. 16 is a flow chart illustrating an example of a method for wireless communication at a network access device (e.g., a base station), in accordance with various aspects of the present disclosure.

FIG. 16 is a flow chart illustrating an example of a method 1600 for wireless communication at a network access device (e.g., a base station), in accordance with various aspects of the present disclosure. For clarity, the method 1600 is described below with reference to a network access device including aspects of one or more of the base stations 105 or 1205 described with reference to FIG. 1 or 12, or aspects of the apparatus 905 described with reference to FIG. 9. In some examples, a base station may execute one or more sets of codes to control the functional elements of the base station to perform the functions described below. Additionally or alternatively, the base station may perform one or more of the functions described below using special-purpose hardware.

At block 1605, the method 1600 may optionally include receiving a random access preamble. The operations at block 1605 may be performed using the wireless communication manager 920 or 1020 described with reference to FIG. 9 or 10, the base station wireless communication manager 1260 described with reference to FIG. 12, or the random access manager 1050 described with reference to FIG. 10.

At block 1610, the method 1600 may include determining whether to schedule a transmission of UCI on a PUSCH in a UpPTS of a subframe. The operations at block 1610 may be performed using the wireless communication manager 920 or 1020 described with reference to FIG. 9 or 10, the base station wireless communication manager 1260 described with reference to FIG. 12, or the UCI manager 935 or 1035 described with reference to FIG. 9 or 10.

At block 1615, the method 1600 may include scheduling the PUSCH in the UpPTS based at least in part on the determination made at block 1610. In some examples, the PUSCH in the UpPTS may be scheduled in response to receiving a random access preamble at block 1605. In some examples, part or all of the scheduling information may be transmitted in DCI or RRC signaling. The operations at block 1615 may be performed using the wireless communication manager 920 or 1020 described with reference to FIG. 9 or 10, the base station wireless communication manager 1260 described with reference to FIG. 12, or the PUSCH scheduler 940 or 1040 described with reference to FIG. 9 or 10.

At block 1620, the method 1600 may optionally include selecting a first offset for scheduling information for the PUSCH in the UpPTS. In some examples, the first offset may differ from a second offset for at least one UCI type configuration selected for an uplink subframe. The operations at block 1620 may be performed using the wireless communication manager 920 or 1020 described with reference to FIG. 9 or 10, the base station wireless communication manager 1260 described with reference to FIG. 12, or the PUSCH scheduler 940 or 1040 described with reference to FIG. 9 or 10.

At block 1625, the method 1600 may optionally include selecting a timing of a TTI in which the scheduling information for the PUSCH in the UpPTS is to be transmitted. The TTI may be selected based at least in part on a latency reduction capability of the UE. In some examples, the latency reduction capability of the UE may include at least one of a scheduling timing reduction capability, a TTI duration reduction capability, or a combination thereof. In some examples, the timing of the TTI in which the scheduling information is transmitted may include a leading boundary occurring at least two subframes prior to the UpPTS, or a leading boundary occurring at least 2.5 subframes prior to the UpPTS. The operations at block 1625 may be performed using the wireless communication manager 920 or 1020 described with reference to FIG. 9 or 10, the base station wireless communication manager 1260 described with reference to FIG. 12, or the scheduling information transmission manager 945 or 1045 described with reference to FIG. 9 or 10.

At block 1630, the method 1600 may include transmitting, to the UE, the scheduling information for the PUSCH in the UpPTS. In some examples, the first offset may be indicated in the scheduling information. The operations at block 1630 may be performed using the wireless communication manager 920 or 1020 described with reference to FIG. 9 or 10, the base station wireless communication manager 1260 described with reference to FIG. 12, or the scheduling information transmission manager 945 or 1045 described with reference to FIG. 9 or 10.

At block 1635, the method 1600 may include transmitting DCI to the UE. In some examples, the DCI may be transmitted as part of the scheduling information transmitted at block 1630. In some examples, the method 1600 may include indicating the presence of an uplink grant for the PUSCH in the UpPTS in the DCI. The indication may be based at least in part on: a state of an information field included in the DCI, a masking of a control channel including the DCI with a predetermined CRC mask, an association of the uplink grant with a predetermined decoding candidate, a size of the DCI, an identifier of a subframe in which the DCI is received, a DCI format, or a combination thereof. The operations at block 1635 may be performed using the wireless communication manager 920 or 1020 described with reference to FIG. 9 or 10, the base station wireless communication manager 1260 described with reference to FIG. 12, or the scheduling information transmission manager 945 or 1045 described with reference to FIG. 9 or 10.

At block 1640, the method 1600 may include managing HARQ. In some examples, managing HARQ may include at least one of: separately managing uplink HARQ for the PUSCH in the UpPTS and uplink HARQ for PUSCH transmissions in uplink TTIs, jointly managing the uplink HARQ for the PUSCH in the UpPTS and the uplink HARQ for PUSCH transmissions in uplink TTIs, or transmitting the uplink HARQ for the PUSCH in the UpPTS and the uplink HARQ for PUSCH transmissions in uplink TTIs asynchronously. The operations at block 1640 may be performed using the wireless communication manager 920 or 1020 described with reference to FIG. 9 or 10, the base station wireless communication manager 1260 described with reference to FIG. 12, or the HARQ manager 1055 described with reference to FIG. 10.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving downlink control information (DCI) during a first subframe of a transmission time interval (TTI), the DCI associated with a first DCI format from a set of DCI formats, wherein the DCI associated with the first DCI format indicates an uplink index value identifying resources for transmitting a physical uplink shared channel (PUSCH) in an uplink pilot time slot (UpPTS) of a second subframe;
   determining, based at least in part on the uplink index value, a timing between receiving the DCI in the first subframe of the TTI and transmitting the PUSCH on the UpPTS, wherein the determined timing is based on a processing latency capability of the UE and the identified resources indicated by the DCI associated with the first DCI format; and
   transmitting the PUSCH in the UpPTS via the identified resources based at least in part on the determined timing and the uplink index value.

2. The method of claim 1, wherein the processing latency capability of the UE comprises a latency reduction capability of the UE.

3. The method of claim 2, wherein the latency reduction capability of the UE comprises at least one of: a scheduling timing reduction capability, a TTI duration reduction capability, or a combination thereof.

4. The method of claim 3, further comprising:
   determining the UE is not capable of latency reduction, wherein the determined timing is based at least in part on determining that the UE is not capable of latency reduction, and wherein the determined timing comprises a leading boundary occurring at least 3.5 subframes prior to the UpPTS.

5. The method of claim 3, further comprising:
   determining that the processing latency capability of the UE comprises the scheduling timing reduction capability,
   wherein the determined timing is based at least in part on determining that the processing latency capability of the UE comprises the scheduling timing reduction capability, and wherein the determined timing comprises a leading boundary occurring at least two subframes prior to the UpPTS.

6. The method of claim 3, further comprising:
determining that the processing latency capability of the UE comprises the TTI duration reduction capability,
wherein the determined timing is based at least in part on determining that the processing latency capability of the UE comprises the TTI duration reduction capability, wherein the determined timing of the TTI comprises a leading boundary occurring at least 2.5 subframes prior to the UpPTS.

7. The method of claim 1, further comprising:
separately managing uplink hybrid automatic repeat request (HARQ) for the PUSCH in the UpPTS and the uplink HARQ for PUSCH transmissions in one or more uplink TTIs.

8. The method of claim 1, further comprising:
jointly managing uplink hybrid automatic repeat request (HARQ) for the PUSCH in the UpPTS and the uplink HARQ for PUSCH transmissions in one or more uplink TTIs.

9. The method of claim 1, further comprising:
asynchronously receiving uplink hybrid automatic repeat request (HARQ) for the PUSCH in the UpPTS and the uplink HARQ for PUSCH transmissions in one or more uplink TTIs.

10. The method of claim 1, further comprising:
receiving an acknowledgement of the PUSCH in the UpPTS in a same set of physical hybrid automatic repeat request (HARD) indication channel (PHICH) resources used to acknowledge PUSCH transmissions in one or more uplink subframes.

11. The method of claim 1, further comprising:
identifying an uplink grant for the PUSCH in the UpPTS, received in the DCI, based at least in part on: a state of an information field included in the DCI, a masking of a control channel including the DCI with a predetermined cyclic redundancy check (CRC) mask, an association of the uplink grant with a predetermined decoding candidate, a size of the DCI, the first subframe in which the DCI is received, a DCI format, or a combination thereof.

12. The method of claim 1, further comprising:
determining a size of the DCI; and
identifying, within the DCI, at least one decoding candidate for an uplink grant for the PUSCH in the UpPTS, the at least one decoding candidate based at least in part on the size of the DCI.

13. The method of claim 1, further comprising:
identifying a first power control parameter for the TTI; and
determining a second power control parameter for the PUSCH in the UpPTS based at least in part on the first power control parameter for the TTI.

14. The method of claim 13, wherein the second power control parameter is determined based at least in part on: a semi-static relationship between the first power control parameter and the second power control parameter, or a variable structure of the PUSCH in the UpPTS.

15. A method for wireless communication comprising:
determining whether to schedule a transmission of a physical uplink shared channel (PUSCH) to be transmitted in an uplink pilot time slot (UpPTS);
transmitting, to a user equipment (UE) during a first subframe, downlink control information (DCI) associated with a first DCI format from a set of DCI formats, wherein the DCI associated with the first DCI format includes an uplink index value that identifies a set of resources allocated for transmission of the PUSCH in the UpPTS of a second subframe, the uplink index value further indicating a timing of a transmission time interval (TTI) for transmitting the DCI and receiving the PUSCH in the UpPTS based at least in part on a processing latency capability of the UE and the set of resources indicated by the DCI associated with the first DCI format; and
receiving the PUSCH in the UpPTS via the set of resources based at least in part on the timing and the uplink index value.

16. The method of claim 15, wherein the processing latency capability of the UE comprises a latency reduction capability of the UE.

17. The method of claim 16, wherein the latency reduction capability of the UE comprises at least one of: a scheduling timing reduction capability, a TTI duration reduction capability, or a combination thereof.

18. The method of claim 17, wherein the timing of the TTI for transmitting the DCI comprises at least one of a leading boundary occurring at least 3.5 subframes prior to the UpPTS, a leading boundary occurring at least two subframes prior to the UpPTS, a leading boundary occurring at least 2.5 subframes prior to the UpPTS, or a combination thereof.

19. The method of claim 15, further comprising:
separately managing uplink hybrid automatic repeat request (HARQ) for the PUSCH in the UpPTS and the uplink HARQ for PUSCH transmissions in one or more uplink TTIs.

20. The method of claim 15, further comprising:
jointly managing uplink hybrid automatic repeat request (HARQ) for the PUSCH in the UpPTS and the uplink HARQ for PUSCH transmissions in one or more uplink TTIs.

21. The method of claim 15, further comprising:
asynchronously transmitting uplink hybrid automatic repeat request (HARQ) for the PUSCH in the UpPTS and the uplink HARQ for PUSCH transmissions in one or more uplink TTIs.

22. The method of claim 15, further comprising:
transmitting an acknowledgement of the PUSCH in the UpPTS in a same set of physical hybrid automatic repeat request (HARQ) indication channel (PHICH) resources used to acknowledge PUSCH transmissions in one or more uplink subframes.

23. The method of claim 15, further comprising:
indicating a presence of an uplink grant for the PUSCH in the UpPTS, in the DCI, based at least in part on: a state of an information field included in the DCI, a masking of a control channel including the DCI with a predetermined cyclic redundancy check (CRC) mask, an association of the uplink grant with a predetermined decoding candidate, a size of the DCI, the first subframe in which the DCI is received, a DCI format, or a combination thereof.

24. The method of claim 15,
wherein the DCI comprises at least one decoding candidate for an uplink grant for the PUSCH in the UpPTS, the at least one decoding candidate based at least in part on a size of the DCI.

25. The method of claim 15, further comprising:
receiving a random access preamble; and
scheduling the transmission of the PUSCH in the UpPTS in response to receiving the random access preamble.

26. An apparatus for wireless communication at a user equipment (UE), comprising:

a processor; and memory coupled with the processor;

the processor and the memory configured to:

receive downlink control information (DCI) during a first subframe of a transmission time interval (TTI), the DCI associated with a first DCI format from a set of DCI formats, wherein the DCI associated with the first DCI format indicates an uplink index value identifying resources for transmitting a physical uplink shared channel (PUSCH) in an uplink pilot time slot (UpPTS) of a second subframe;

determine, based at least in part on the uplink index value, a timing between receiving the DCI in the first subframe of the TTI and transmitting the PUSCH on the UpPTS, wherein the determined timing is based on a processing latency capability of the UE and the identified resources indicated by the DCI associated with the first DCI format; and transmit the PUSCH in the UpPTS via the identified resources based at least in part on the determined timing and the uplink index value.

27. The apparatus of claim 26, wherein the processing latency capability of the UE comprises a latency reduction capability of the UE.

28. The apparatus of claim 27, wherein the latency reduction capability of the UE comprises at least one of: a scheduling timing reduction capability, a TTI duration reduction capability, or a combination thereof.

29. An apparatus for wireless communication at a network device, comprising:

a processor; and memory coupled with the processor;

the processor and the memory configured to:

determine whether to schedule a transmission of a physical uplink shared channel (PUSCH) to be transmitted in an uplink pilot time slot (UpPTS);

transmit, to a user equipment (UE) during a first subframe, downlink control information (DCI) associated with a first DCI format from a set of DCI formats, wherein the DCI associated with the first DCI format includes an uplink index value that identifies a set of resources allocated for transmission of the PUSCH in the UpPTS of a second subframe, the uplink index value further indicating a timing of a transmission time interval (TTI) for transmitting the DCI and receiving the PUSCH in the UpPTS based at least in part on a processing latency capability of the UE and the set of resources indicated by the DCI associated with the first DCI format; and UpPTS; and receive the PUSCH in the UpPTS via the set of resources based at least in part on the timing and the uplink index value.

30. The apparatus of claim 29, wherein the processing latency capability of the UE comprises a latency reduction capability of the UE.

* * * * *